US008666683B2

(12) United States Patent
Rogers et al.

(10) Patent No.: US 8,666,683 B2
(45) Date of Patent: Mar. 4, 2014

(54) SYSTEM, METHOD AND APPARATUS FOR MONITORING FLUID STORAGE AND DISPENSING SYSTEMS

(75) Inventors: Warren F. Rogers, Newport, RI (US); John R. Collins, Punta Gorda, FL (US); Jillianne B. Jones, Narragansett, RI (US); William P. Jones, Narragansett, RI (US); Michael A. Lenox, Murfreesboro, TN (US)

(73) Assignee: Warren Rogers Associates, Inc., Middletown, RI (US)

( * ) Notice: Subject to any disclaimer, the term of this patent is extended or adjusted under 35 U.S.C. 154(b) by 747 days.

(21) Appl. No.: 12/702,927

(22) Filed: Feb. 9, 2010

(65) Prior Publication Data

US 2011/0040503 A1  Feb. 17, 2011

Related U.S. Application Data

(60) Provisional application No. 61/151,011, filed on Feb. 9, 2009.

(51) Int. Cl.
 *G01F 23/00* (2006.01)
(52) U.S. Cl.
 USPC ................ 702/55; 702/51; 702/45; 73/40.5 R
(58) Field of Classification Search
 USPC ......... 702/45, 50, 51, 55; 73/40, 40.5 R, 861, 73/290 R
See application file for complete search history.

(56) References Cited

U.S. PATENT DOCUMENTS

| 5,297,423 | A  | * | 3/1994 | Keating et al. ................. 73/49.2 |
| 6,925,397 | B2 | * | 8/2005 | Rogers et al. .................... 702/50 |
| 2008/0184781 | A1 | * | 8/2008 | Mulligan et al. ........... 73/40.5 R |

OTHER PUBLICATIONS

International Search Report and Written Opinion for International Application No. PCT/US2010/023623, mailed Aug. 31, 2010 (11 pgs.).

* cited by examiner

*Primary Examiner* — Manuel L Barbee
(74) *Attorney, Agent, or Firm* — K&L Gates LLP

(57) ABSTRACT

In one aspect, the invention relates to a system for monitoring a fluid dispensing system having a storage tank and a piping system having a maximum output flow rate threshold. The system includes a dispenser configured to dispense fluid from the fluid dispensing system during a dispensing time interval, a metering device in fluid communication with piping system, the metering device configured to measure a plurality of sample flow rates over time in response to fluid passing through the metering device, a gauge for measuring a volume of fluid dispensed from the storage tank during the dispensing time interval and a processor for executing a monitoring application which generates an alert within a substantially real-time period in response to an event of interest, the monitoring application comparing the maximum output flow rate threshold to the plurality of sample flow rates over time to generate the alert when one of the sample flow rates exceeds the maximum output flow rate threshold.

12 Claims, 10 Drawing Sheets

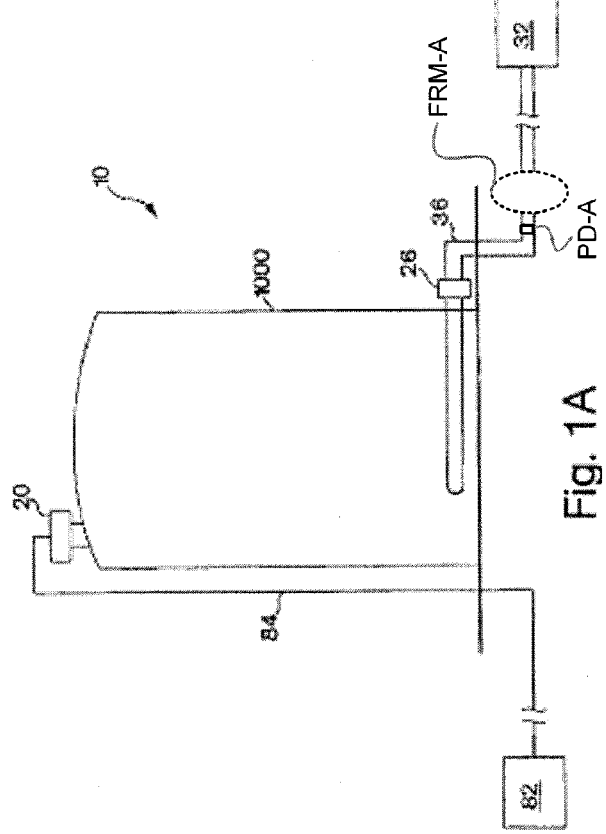
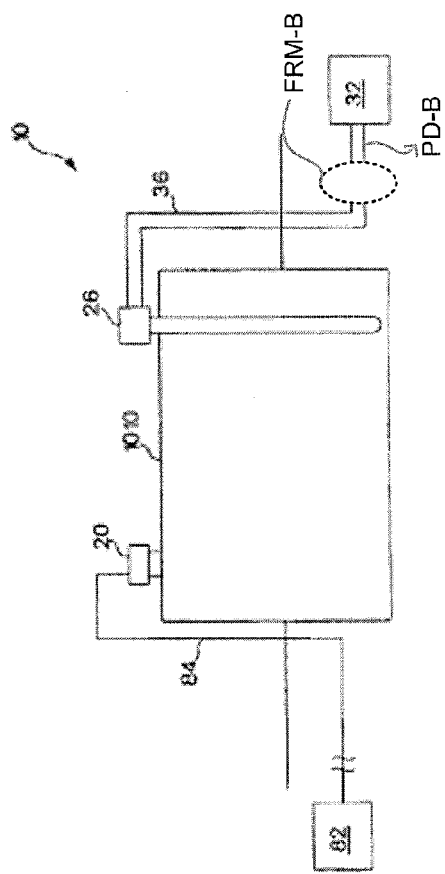
Fig. 1A
Fig. 1B

SYSTEM, METHOD AND APPARATUS FOR MONITORING FLUID STORAGE AND DISPENSING SYSTEMS

RELATED APPLICATION

This application claims the benefit under 35 U.S.C. §119(e) to U.S. Provisional. Application No. 61/151,011, filed on Feb. 9, 2009, the disclosure of which is incorporated herein by reference in its entirety.

FIELD OF THE INVENTION

The invention relates to monitoring fluid storage systems using flow rates and other related parameters to detect events of interest such as leaks, errors, failures, and thefts.

BACKGROUND OF THE INVENTION

Large quantities of liquids and similar materials are often stored in bulk storage containers or tanks, which may be located above-ground, partially above-ground, or completely below ground. Such containers or tanks are generally connected by piping to dispensers. For example, underground storage tanks (UST's) and, occasionally, above-ground storage tanks (AST's) are used to store petroleum products and fuel to be dispensed at automobile service stations, trucking terminals, automobile rental outlets, and similar operations through gasoline, diesel, fuel with biofuel constituents, or kerosene dispensing pumps.

Fuel product is generally delivered to such facilities by a gravity drop from a compartment in a wheeled transport means such as a fuel delivery truck. AST's or UST's are often located at central distribution locations so that product can be subsequently withdrawn from the tank system to be transported for delivery to a variety of such facilities. A distribution location with UST's or AST's may receive deliveries of product from, e.g., a pipeline spur, wheeled transport, a barge, or a rail car.

Direct observation of the operating condition of such tanks and storage containers is difficult or impossible. The various methods for identifying the amount of product in tank systems have varying levels of accuracy, repeatability, and performance. Moreover, the accuracy of devices which measure the amount of product dispensed from the storage containers and tanks differs greatly, and are often designed for infrequent measurement periods.

Consequently, effective management of such facilities is complicated by the numerous errors and time delay associated with the various measuring devices and procedures used to detect thefts, leaks, and other catastrophic failures.

Traditionally, these functions were performed crudely or, in many cases, not at all. Volume measurements were, and in many instances still are, based on imperfect knowledge of the geometry, dimensions, and configuration of the storage vessel. Also, dispensing meters are frequently miscalibrated. This is true even when the operation of tank systems is regulated, due to the breadth of tolerance permitted for individual sales as related to total tank volume.

There are numerous other instances of unregulated behavior at dispensing and storage stations. For example, fuel deliveries are almost always unmetered, additions of product from defueling vehicles are often not monitored, and theft of the product is not uncommon. In addition, many existing volume-based approaches are not suitable to the real-time or dynamic monitoring and inventorying of fuel product. Similarly, real-time monitoring of fuel intake, fuel leaks, fuel thefts, and other changes in fuel inventory had not been available. Generally, monitoring of fluid storage facilities is performed during quiet periods when no fluid is moving. Further, the time elapsed between these quiet periods is usually measured in terms of several hours or even days.

In addition, although there is extreme volatility in oil and fuel prices in the short term, the general projections for the future indicate that prices will only increase. The significant costs associated with purchasing fuel increases the incidence of theft at fueling stations. Further, since the trend is toward larger scale fuel stations that dispense large volumes of fuel per month, it is likely that the costs associated with theft of fuel will increase and that, when a leak occurs, a greater amount of product loss will remain undetected for long periods of time.

In order to combat theft, mitigate losses, and improve the speed which leaks are detected, a need exists for improved monitoring of fuel dispensing and storage systems.

SUMMARY OF THE INVENTION

In part, the invention relates to various computer-based systems, methods, and devices that collect data from a fluid storage and dispensing facility and process the data within a substantially real-time detection interval. As a result, the collected and processed data is used to detect events of interest such that the events can be quickly acted upon to improve the safety and operation of the facility. In a preferred embodiment, the data collected is flow rate data associated with a tank, a piping system, dispensers, or other fluid transporting elements in a given facility.

In an aspect, the invention relates to a processor-based system for monitoring a fluid dispensing system having a storage tank and a piping system, the piping system having a maximum output flow rate threshold. The processor-based system includes a dispenser configured to dispense fluid from the fluid dispensing system during a dispensing time interval; a metering device in fluid communication with piping system, the metering device configured to measure a plurality of sample flow rates over time in response to fluid passing through the metering device; and a processor for executing a monitoring application that generates an alert within a substantially real-time period in response to an event of interest, the monitoring application comparing the maximum output flow rate threshold to the plurality of sample flow rates over time to generate the alert when at least one of the sample flow rates exceeds the maximum output flow rate threshold, and wherein the monitoring application is configured to operate during active periods of dispensing fluid from the fluid dispensing system.

In one embodiment, the substantially real-time period ranges from about 5 seconds to about 90 seconds. The metering device can be positioned in a trunk line, the trunk line being disposed in the piping system between the storage tank and the dispenser. The metering device can be an advanced flow device, the advanced flow device includes a module selected from the group consisting of a flow rate module, a temperature sensing module, a direction of flow module, a shut down module, and a data collection module. In one embodiment, the monitoring application generates an event of interest alert when the dispenser is not authorized in an off-hook state and at least one flow rate at the metering device is greater than the maximum output flow rate threshold. The dispenser can include a dispenser metering device, and wherein the monitoring application generates a dispensing alert when a piping system flow rate measured at the metering device is greater than a dispensing flow rate measured at the dispenser metering device. The dispenser has a state in one embodiment. The processor can be configured to determine a modified maximum output flow rate threshold when the state changes. The system can also include a gauge for measuring a volume of fluid dispensed from the storage tank during the dispensing time interval. Further, the metering device can include a module for detecting changes in fluid flow direction. The system can further include a pressure detector in fluid communication with the piping system and in electrical communication with the processor. In one embodiment, the pressure detector transmits a signal to the monitoring application associated with a pressure change in the piping system such that the monitoring application generates one of an alert or a shut down signal when the pressure change deviates from a normal pressure level.

In another aspect, the invention relates to a processor-based system for monitoring a fluid dispensing system having a piping system, the piping system having a maximum output flow rate threshold. The processor-based system includes a tank for storing the fluid; a plurality of flow rate metering modules for providing, at a plurality of times, data indicative of fluid flow rate; and a processor for receiving the data from the metering modules, calculating a flow rate value at each of the plurality of times, calculating a flow rate difference between the maximum output flow rate and the flow rate metering module indicated flow rate at each of the plurality of times, and generating an alert corresponding to an event of interest when the flow rate difference indicates the maximum output flow rate threshold has been exceeded.

In one embodiment, the processor generates alerts within a substantially real-time period. Further, the substantially real-time period can range from about 5 seconds to about 90 seconds. One of the plurality of flow rate metering modules can be disposed in a trunk line of the piping system and another one of the plurality of flow rate metering modules can be disposed within a dispenser in fluid communication with the piping system. In another embodiment, one of the plurality of flow rate metering modules is an advanced flow device, the advanced flow device can include a module selected from the group consisting of a flow rate module, a temperature sensing module, a direction of flow module, a shut down module, and a data collection module. In one embodiment, the event of interest can be selected from the group consisting of a line leak, a tank leak, a theft, and a dispenser error.

In yet another aspect, the invention relates to a method of monitoring a fluid storage and dispensing system to detect fluid release events within a detection interval, the method implemented using a computer. The method includes the steps of generating a first set of flow rate data at a first point in time at a first location in a piping system using a first flow rate meter, the piping system connected to the fluid storage and dispensing system and having a plurality of outlets; determining a reaction threshold for the piping system, the reaction threshold corresponding to a maximum flow rate through the plurality of outlets of the piping system, the maximum flow rate having an allowable margin of error; and generating an alert within a substantially real-time period.

In one embodiment, an alert is generated when the first set of flow rate data is greater than the reaction threshold. The method can also include the steps of generating a second set of flow rate data at a second point in time at the first location in the piping system, wherein the alert is generated based on a comparison of the first set of flow rate data to the second set of flow rate data. In addition, the method can include the step of periodically adjusting the reaction threshold using the first set of flow rate data. In one embodiment, the detection interval ranges from about 30 seconds to about 90 seconds. Further, at least one of the steps is performed while fluid is moving in the system piping system in an embodiment. The method can also include the step of automatically stopping fluid flow in a segment of the piping system when the alert is generated. In another embodiment, the method can include the steps of detecting back flow in a portion of the piping system and dynamically adjusting the reaction threshold in response to the back flow. Further, the method can include the step of collecting a set of pressure data at a location in a piping system using a pressure detector and wherein the alert is generated when the pressure data deviates from a predetermined pressure profile.

It should be understood that the terms "a," "an," and "the" mean "one or more," unless expressly specified otherwise.

It should be understood that the order of the steps of the methods of the invention is immaterial so long as the invention remains operable. Moreover, two or more steps may be conducted simultaneously or in a different order than recited herein unless otherwise specified.

The foregoing, and other features and advantages of the invention, as well as the invention itself, will be more fully understood from the description, drawings, and claims which follow.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views. The drawings associated with the disclosure are addressed on an individual basis within the disclosure as they are introduced.

FIG. 1A is a schematic diagram of a facility including an above-ground tank storage system that incorporates a flow rate meter according to an illustrative embodiment of the invention.

FIG. 1B is a schematic diagram of a facility including a partially above-ground tank storage system that incorporates a flow rate meter according to an illustrative embodiment of the invention.

The claimed invention will be more completely understood through the following detailed description, which should be read in conjunction with the attached drawings. In this description, like numbers refer to similar elements within various embodiments of the present invention.

DETAILED DESCRIPTION

Figure 1:
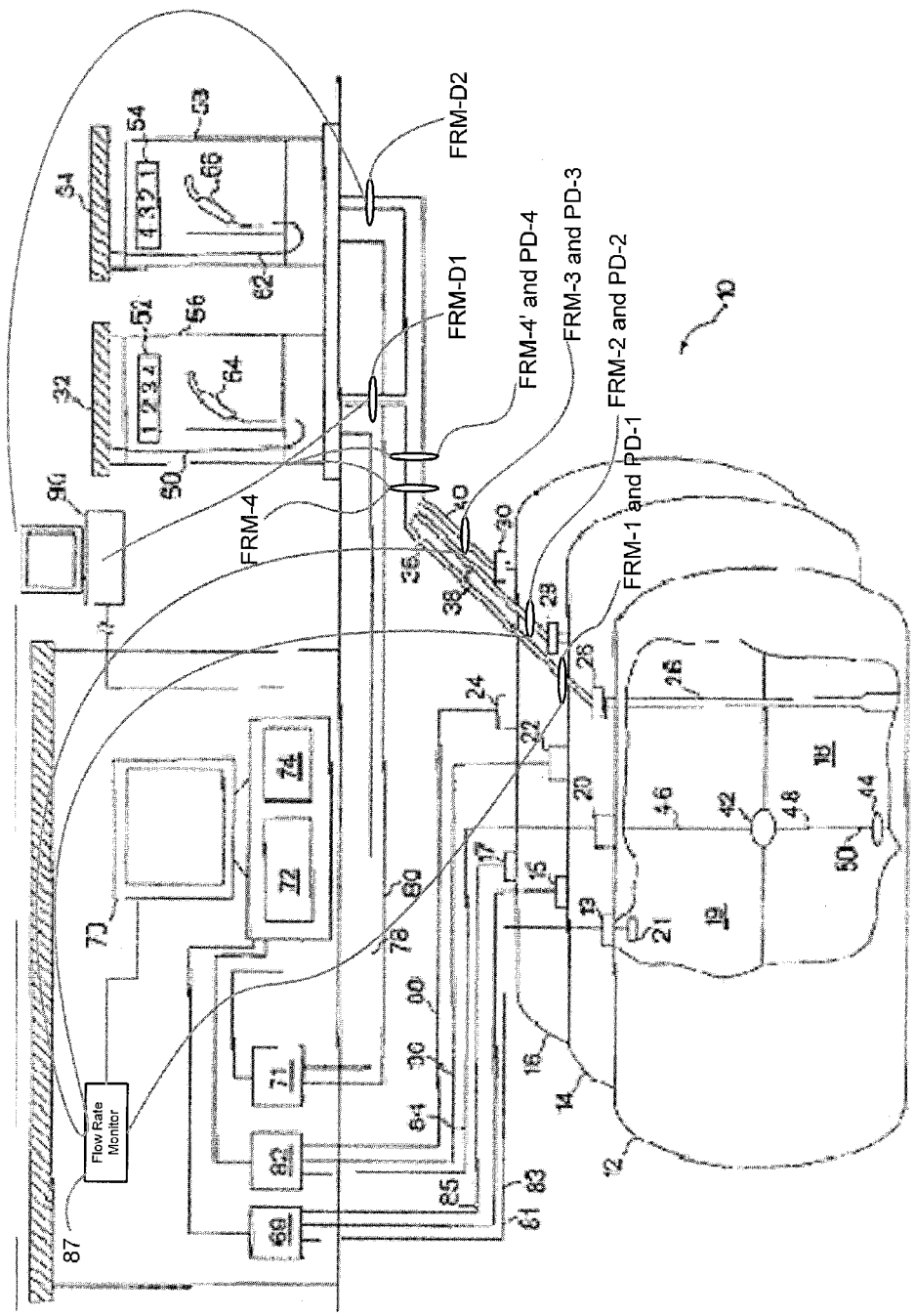
FIG. 1 is a schematic diagram of a facility including an underground tank storage system that incorporates flow rate meters and other data collection devices according to an illustrative embodiment of the invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

Detection of problems in liquid storage and dispensing systems has traditionally been based on identification of anomalies in liquid volumes. Storage tank system leakage and other losses from inventory are detected by identifying disparities between total metered volumes dispensed and observed gauged volumes removed from the storage tanks. Meter calibration errors are identified, in like manner, by comparing volumes recorded independently on each of the various individual dispensing devices with the gauged volumes removed from the storage tanks as those volumes are dispensed. These volume based approaches can only be performed during quiet-periods, when fluid is not moving in the piping system. Active periods (periods when fluid is moving in the piping system) are not are not suitable for comparing dispensed volumes and tank volume measurements. However, the flow-rate based approaches described herein are well suited to dynamic operation such as collecting data during active periods.

Given sufficient activity and the time necessary to achieve it, such volume-based methods can be extremely accurate. The requisite time to achieve a statistically significant minimum detectable volume loss is, however, an inherent shortcoming of volume based detection systems. Some detection systems only process data during periods of inactivity, when no fluid is flowing in the system being monitored. As a result, if there is a leak in the system it may persist and contaminate the site. Further, product continues to be dispensed through miscalibrated meters for extended times between periods of inactivity and theft can persist without detection as a result of the lengthy detection period. The time it takes to accumulate the volumes sufficient to achieve detection by identification of volume discrepancies allows many system problems to continue unchecked until it is too late. With real-time monitoring (made possible using various flow rate-based techniques), the contamination and costs associated with detecting a leak, several hours (or days) after it starts, and other losses due to errors and thefts can be mitigated.

The embodiments described herein provide a significant improvement relating to fluid monitoring systems suitable for use in fluid storage and fluid dispensing facilities. Specifically, several of the embodiments and features facilitate fluid monitoring and analysis (either on-site or remotely) while fluid is moving in the system (i.e., during active periods) being monitored. For example, in the case of a fueling station or fuel storage site, various monitoring and theft detection features are made available by these embodiments while fuel is being actively dispensed, while deliveries are taking place, or while both dispensing and delivery is occurring simultaneously. This ability to monitor an active fluid storage and dispensing facility offers many advantages to facility operators and owners relative to systems that only analyze data hours or days after its collection.

In some embodiments, the installed flow rate meter or other device operates in conjunction with storage tank gauge readings, such as those from an automatic tank gauge (ATG). In part, the embodiments described herein represent a transition from only using infrequently obtained volume readings to using flow rates derived directly from an installed flow rate meter or other device to quickly detect events of interest. By using flow rates rather than volumes (or flow rates in combination with volume-based analysis methods and devices) substantially instantaneous identification of line leakage, tank leakage, piping system problems, meter discrepancies, theft, and other anomalies, and other events become possible and practical. The use of flow rates or the combined rates derived from installed meters and tank gauge offers many advantages relative to existing systems. Further enhancements are possible by including various sensors and other modules within the relevant fluid storage and dispensing system and the underlying piping system.

Prior to discussing the aspects of various flow-rate specific embodiments in detail, an introduction to some of the characteristic terminology used herein may prove informative. However, the scope of the terms discussed herein is not intended to be limiting, but rather to clarify their usage and incorporate the broadest meaning of the terms as known to those of ordinary skill in the art.

A fluid is any liquid with or without suspended solids. Thus, a fluid can include, but is not limited to mixtures that might not normally be considered liquid such as slurries like mud, concrete, fertilizer, etc. Fuel product such a diesel fuel, bio-diesel, gasoline, jet fuel, kerosene, and other combustible liquids are exemplary fluids that can be monitored, mixed, injected and dispensed with respect to various embodiments. However, this list is not exhaustive as any fluid can be used.

In an embodiment, a piping system includes any system (or component thereof) for moving fluids having one or more inlets where fluid enters a system and one or more outlets where fluid exits the system (or is stored). An example would be the pipes (or pipe) that route petroleum fuels from various tanks to the dispensers at a fuel storage or dispensing facility. Other piping system embodiments can include, but are not limited to tubing, conduit, lines, trunk lines, pumps, dispensers, valves, flexible hoses, cisterns, cylindrical volumes, a single vessel, and a tank.

In an embodiment, a line leak event is identified or detected when (1) all active dispensers are recording metered sales and (2) the tank output flow rate measured by a meter or gauge exceeds known throughput rates of active dispensers. Thus, in an embodiment, when all of the dispensers in a system are dispensing fluid at a combined rate, if fluid is leaving the tank at a rate greater than that combined rate of the active dispensers, fluid is being pumped through a leak in a piping system. In another embodiment, a line leak event occurs when the maximum output threshold (a maximum flow rate value) of the outlet ports of the system (typically the dispensers) is exceeded by the flow rate in a component of the system positioned in the piping system before the outlet ports of the system.

In an embodiment, a tank leak event is identified when the (1) tank output rate is consistent with dispenser throughput rates and (2) the tank output rate measured by a tank gauge shows excess fluid leaving the tank. In an embodiment, the tank gauge tracks tank fluid volume in combination with a tank flow rate meter to detect certain events of interest.

A theft event occurs when a tank output rate exceeds an active dispenser throughput rate in an embodiment. Alternatively, a theft event occurs when one or more dispensers are active, but not metering or counting fluid being dispensed. Similarly, a gauge malfunction occurs when fluid removal rates generated from a tank gauge (or other device) differ from those indicated by a tank flow rate meter in an embodiment.

In an embodiment, a reaction threshold refers to a data point or a data range in a set of monitoring data, where the value of the data point or data range corresponds to or exceeds a predetermined threshold. In an embodiment, a reaction threshold is a mechanism that is used to indicate that some action should be initiated based on the threshold being met, exceeded, or not met. In an embodiment, a fault or an event of interest includes an abnormal state or a status change in a piping system that exists when a threshold is reached, exceeded, or not met. Events of interest are typically a type of fluid release event.

In an embodiment, a flow rate meter or a flow rate monitor includes any device, circuit, computer, method, or software used to measure fluid flow. In a preferred embodiment, a flow rate meter includes a rotating element, such as a turbine or vane, which moves as fluid passes through it. The direction of flow in such a meter (whether in the same pipe or in different pipes at a junction) can be detected or inferred in various embodiments, such as, for example, the advanced flow device (AFD) shown in FIG. 3. If there is back flow in a line or other component of the piping system in an embodiment, the in-line flow rate meters described herein can detect the direction of flow, a first flow direction into a tank or a second, opposing flow direction going out to a dispenser, at different points in time. In a preferred embodiment, the movement of the rotating element is linked, either directly or indirectly, with an encoder (or pulser) that translates the rotational movement into electrical pulses. The pulses are counted by a counter device in some embodiments. In another embodiment, mechanical flow meters that are coupled to a mechanical counter can also be used.

In addition to the use of advanced flow devices, one embodiment of the invention includes a pressure transducer/pressure detector (PD), either alone or in combination with one or more AFDs. A PD is inserted in the piping system to monitor and relay pressure changes to a subsystem or device for capture or further processing. The pressure detector can be used to monitor pressurization and depressurization events of varying degrees over time with respect to one or more components of the piping system. Based on the measurements taken using the pressure detector, a standard profile for the pressure changes of the piping system associated with typical system operation can be established for a time period of interest. In turn, deviations from the standard profile can be used to detect events of interest such as leaks or theft events.

For example, since a line leak results in an unexpected pressure change in the piping system, the data from the pressure detector can be used to identify the pressure change and the associated leak and relay that data to a processing or control system, which will shut down the flow of fuel product to prevent further loss and site contamination. Accordingly, when a leak occurs, the pressure in one or more components of the piping system will drop to zero or near zero. This pressure change can be detected and transmitted using a pressure detector. Additional details relating to pressure detectors are provided below.

The systems, methods, and apparatus described herein solve the problem associated with time delay in volume-based monitoring systems. In part, the solution follows because of a shift from identifying volume discrepancies to identifying discrepancies in rates of change of volumes or, more simply, flow rate discrepancies or changes over time. In short, by identifying discrepancies between the rates of flow from the storage tanks with the rates of flow associated with other fluid transporting elements in the piping system (either individually or in the aggregate) such as fluid dispensers, it is possible to achieve substantially real-time detection of an event or problem of interest. The various embodiments described herein are applicable to any piping system and need not apply strictly to a "service station" or any fuel dispensing or storage facility. All some of the embodiments described herein improve upon volume based approaches, and in some embodiments, volume data can be used complementary with the approaches and devices described herein.

In an embodiment, real-time (or in a substantial real-time basis) refers to performing an action in less than about 300 seconds. In another embodiment, real-time refers to performing an action in less than about 180 seconds. In yet another embodiment, real-time refers to performing an action in less than about 90 seconds. In still yet another embodiment, real-time refers to performing an action in less than about 60 seconds. Further, in yet another embodiment real-time refers to performing an action in less than about 30 seconds. In still yet another embodiment, real-time refers to performing an action in less than about 15 seconds. Further, with respect to another embodiment, real-time refers to performing an action in less than about 10 seconds. In an embodiment, the time period for detecting an event of interest using the flow rate based approaches described herein ranges from greater than about zero seconds to about 90 seconds, more preferably from between about 5 seconds and about 60 seconds, and still more preferably from between about 5 seconds and about 30 seconds. Further, in an embodiment, detecting a flow rate discrepancy relative to an expected actual or nominal flow rate within a range of about 5 seconds to about 10 seconds is desirable.

As used herein, the terms "dynamic" and "real-time" can be used interchangeably. In an embodiment, the term dynamic refers to actions taken while at least one component of an overall fluid dispensing and storage system is operating and fluid is moving somewhere within the system or being dispensed from it. In contrast with some of the dynamic methods and systems described herein, current methods of leak detection in lines (mechanical or electronic line leak detectors) only function when there is no fuel being dispensed. Instead, they function by impeding flow in the line when a pump starts, but no fuel is being withdrawn from the dispensers because line pressure is not being maintained. With the AFD's and FRM's described herein, it is possible to detect flow rate discrepancies after the dispensers have become active. Similarly, a flow discrepancy that occurs when theft is taking place is detectable using dynamic techniques and devices as described below.

In general, to collect the data suitable for detecting flow rate discrepancies, a flow rate meter, a plurality of flow rate meters, or other devices are typically installed in the piping system or dispensers of a fluid storage and dispensing facility. In an embodiment, the apparatus, system, and methods described herein identify tank leaks by noting rate excedences and other deviations derived from a tank gauge relative to data obtained by the installed meter. One approach to real-time theft detection is implemented by periodically polling the dispensers. In an embodiment, the dispensers are frequently polled to determine (1) which are active and (2) to determine, based upon flow rate data, if one or more of the dispensers are not recording dispensing events. Tracking the state of the dispenser also facilitates theft detection.

Frequent data gathering is another feature of the invention. In general, the real-time data collection made possible using various flow rate-based embodiments offers many advantages relative to existing technology. For example, real-time continuous data collection enables a measure of dead time, which is of concern to management, particularly at high volume throughput sites. Real-time monitoring also provides for near continuous real-time evaluation of dispenser performance by rapid collection of dispensing rate data throughout the performance of a specific fluid related transaction or event.

Some of the method, system, and apparatus flow rate-based embodiments described herein can use the devices and procedures listed in U.S. Pat. Nos. 6,934,644; 6,925,397; 6,909,986; 6,691,061; 6,401,045 and 5,757,664 (the disclosures of which are herein incorporated by reference in their entirety), in conjunction with suitable flow rate meters, modules, sensors, advanced flow diagnostic devices, software, hardware, and other technology as described herein. Furthermore, the present invention builds on the statistical analysis methods of U.S. Pat. Nos. 5,757,664 and 6,925,397 to provide more accurate measurement of the calibration state of multiple metering devices that experience simultaneous disbursements.

The method and apparatus described herein applies to under ground storage tanks ("UST's), above ground storage tanks ("AST's") or any type of storage tank. In general, the embodiments described herein relate to any fluid storage system or device in which flow rates (and the corresponding direction of flow, in an embodiment) associated with fluid entering or exiting from the same can be measured and processed. The materials stored in the tank may be any fluid, including dry particles that flow in the manner of a fluid.

FIG. 1 shows a UST facility 10, illustrated as an automobile service station. Facility 10 includes a series of UST's 12, 14, 16, which may store the same, or different types of liquid fuel product 18. Volumetric tank gauges 20, 22, 24 in each tank measure the height of product 18 in the tank. Submersible pumps 26, 28, 30 in each tank pump product 18 to one of dispensing pumps 32, 34 (alternatively dispensers) through piping lines 36, 38, 40. As shown, a plurality of flow rate meters (FRM's) is shown disposed throughout the piping system. Although a plurality of FRM's are shown, in an embodiment, only a single FRM is installed within the piping system that connects to the dispenser. For several of the embodiments disclosed herein, wherever a flow rate meter (FRM) or other data collection device is referenced, as an alternative embodiment, an advanced flow device (AFD) can be used to perform the flow rate metering or other data collection. Additional details relating to an AFD embodiment are provided below with respect to FIG. 3.

Figure 2:
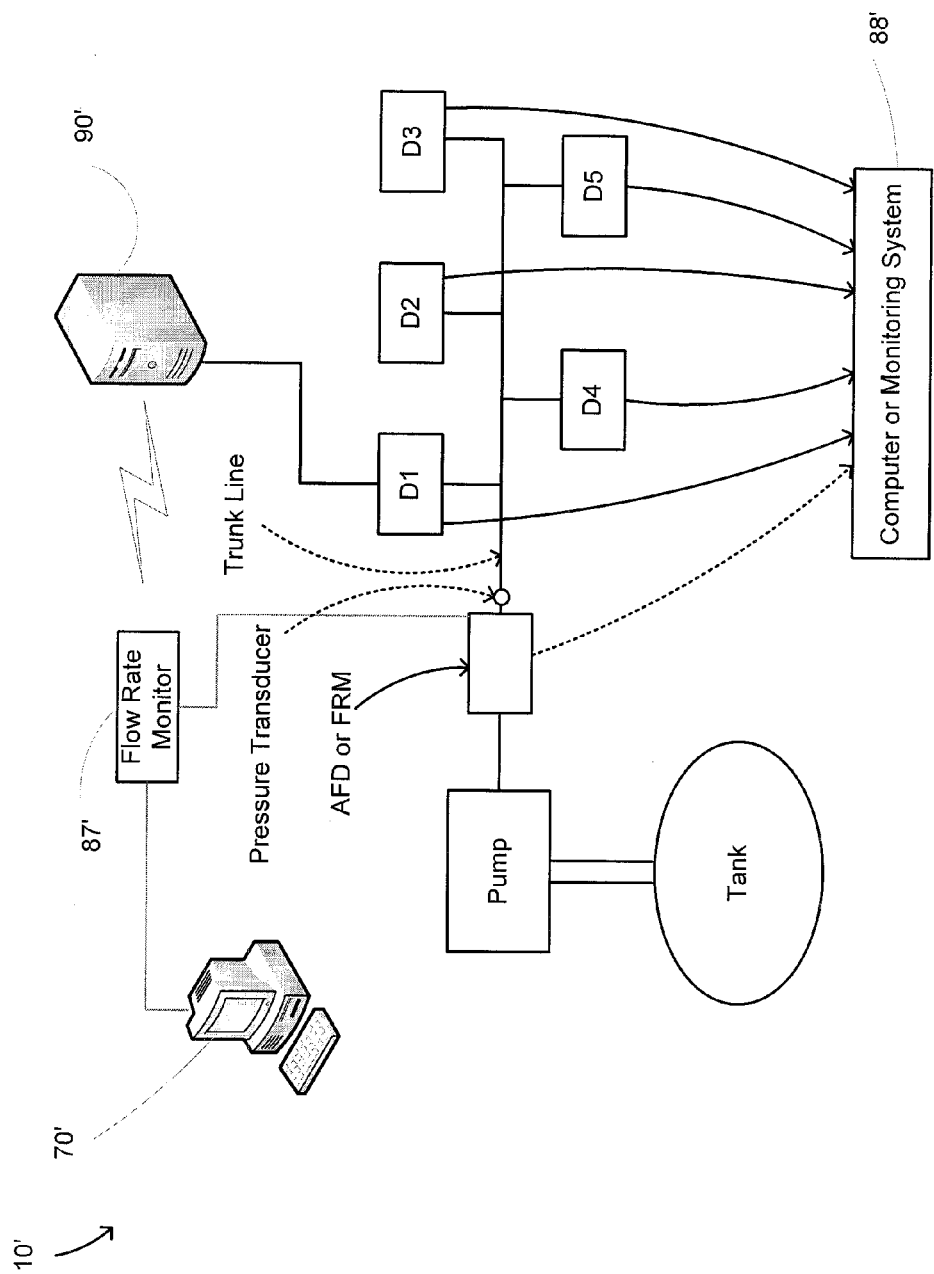
FIG. 2 is a schematic diagram of a generalized fluid and storage dispensing system according to an illustrative embodiment of the invention.

In an embodiment, one or more of the FRM's is a "trunk meter" such as that shown in the system 10' of FIG. 2 (between the pump and the start of the trunk line) based on its position relative to manifold branches or dispenser branches in the piping system. In an embodiment, flow rates can be determined (either with or without FRM data) from a transaction associated with a fuel purchase. That is, a given flow rate can be derived for a given transaction. This is possible because volumes of fluid leaving the outlets can be tracked as they accumulate and the time of the transaction (period of fluid flow) can be counted and recorded electronically using a local or remote computer. As a result, a rough estimate of flow rate for a given dispenser for a given dispensing session can be determined indirectly using other parameters.

One or more of the FRM's are electrically connected or linked (either directly via wires, optical fiber or another connection, or indirectly via a wireless link) to local or remote data collection and processing computers or other devices. Since a plurality of manifolded fluid storage tanks 12, 14, and 16 are shown, each tank includes its own associated FRM, such as FRM-1, FRM-2, and FRM-3 shown in FIG. 1. In an embodiment, a single trunk meter FRM-4 can be used in a system where all fluid flows from the tanks through one trunk line to the dispensers. Further, a second back-up trunk meter FRM-4' can also be included in some embodiments. Two exemplary fluid dispensers 32, 34 are shown having associated flow rate meters, FRM-D1 and FRM-D2. In an embodiment, flow rate meters may be directly integrated within dispensers 32, 34, as such FRM-D1 and FRM-D2 are optional for inclusion in the piping system. In one embodiment, various pressure detectors such as pressure transducers can be incorporating in the piping system at the same location or a different location as each of the FRMs. For example, as shown in FIG. 1, various pressure detectors PD-1, PD-2, PD-3, and PD-4 are positioned at different locations in the piping system.

Alternately, facility 10 may be an AST facility with aboveground tank 1000, as shown in FIG. 1A, or a facility with a partially above-ground tank 1010, as shown in FIG. 1B. With respect to the embodiment of FIG. 1A, a single flow rate meter FRM-A is shown in a piping system positioned between a dispensing pump 32 and a tank pump 26. Similarly, as shown in FIG. 1B, a single flow rate meter FRM-B is shown in a piping system positioned between a dispensing pump 32 and a tank pump 26 for a partially above-ground tank system. Pressure detectors PD-A and PD-B can also be disposed within the lines as shown in FIGS. 1A and 1B.

Figure 2A:
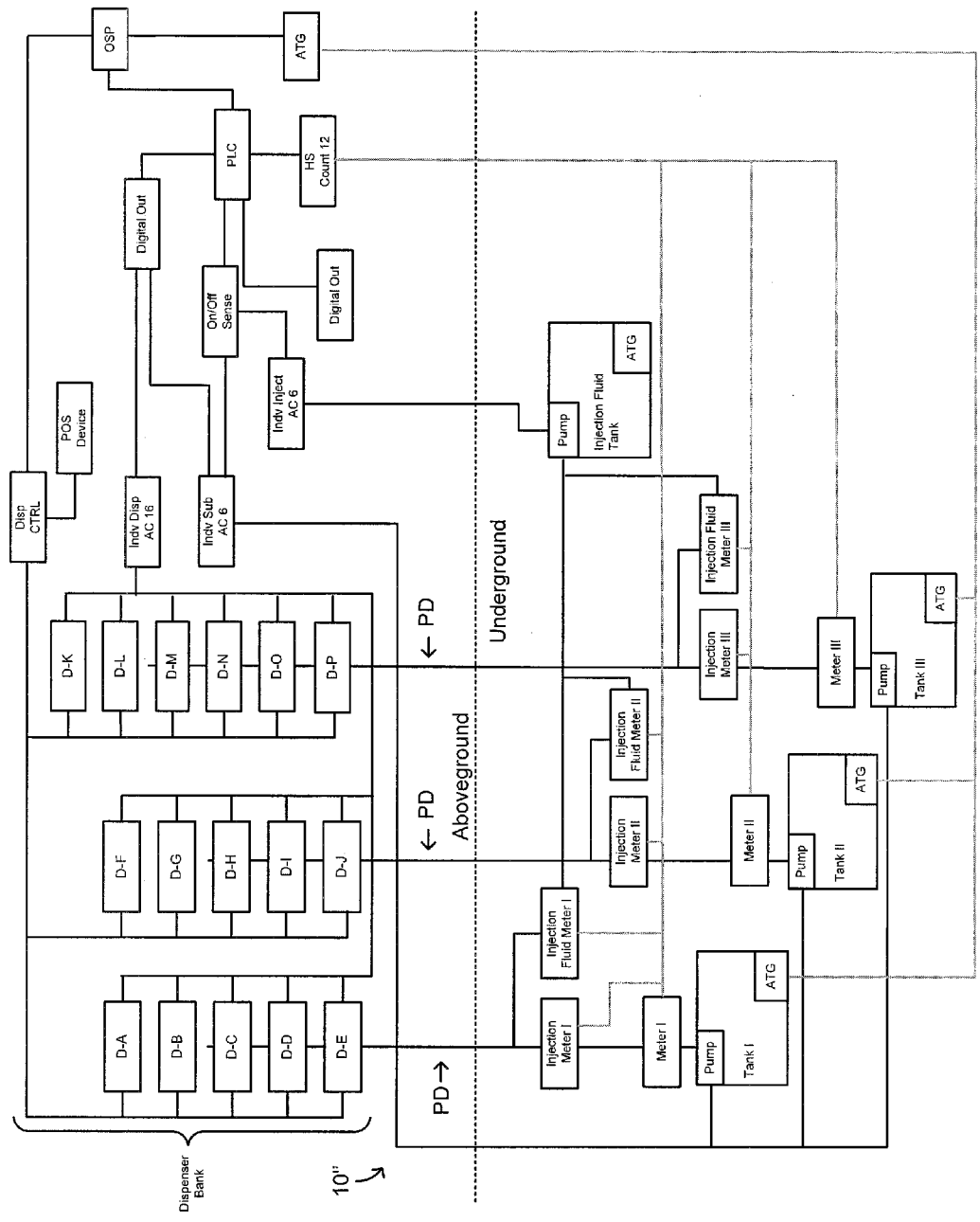
FIG. 2A is a schematic diagram of a specific fluid and storage dispensing system that incorporates a fluid injection subsystem according to an illustrative embodiment of the invention.

FIG. 2 shows fuel storage and dispensing system 10' that includes an underground or above-ground fuel tank consistent with that shown in FIG. 1A or 1B. Further, FIG. 2A shows a facility 10" with fluid injection subsystems (such as a biodiesel injection subsystem) and a plurality of above-ground and underground components. Additional details relating to the embodiments of FIGS. 1-1B, and FIGS. 2-2D are described in more detail below. A pressure transducer can also be positioned in the trunk line as shown to collect pressure data and relay it to a local computer 70' or a remote computer 90.

Returning to FIG. 1, tank gauges 20, 22, 24 are mounted in tanks 12, 14, 16. The tank gauges may include or be based on magnetostrictive tank probes or other sensing technologies. In the case of magnetostrictive technology, two floats 42, 44 surround each probe, e.g., gauge 20 in tank 12. One float 42 floats on the upper surface of product 18 in tank 12, and the other float 44 floats on the interface of product 18 with any water or other foreign material collected at the bottom of tank 12. Tank gauge 20 calculates the difference in position between floats 42, 44 to obtain the height of product 18 in tank 12. Tank gauge 20 also contains temperature sensors 46, 48, 50 spaced along its length to monitor the temperature of product 18 at various depth levels. In an embodiment, the FRM's installed in the piping system include temperature sensing and other functionalities in addition to or in lieu of sensors 46, 48, and 50.

Rates of flow can be determined by measurements of gauged tank volumes removed per unit of time. However, flow rate is typically determined using one or more FRM's or AFD's. Thus, in an embodiment, the system 10 provides for frequent collection of flow rate data and volume data while transactions are taking place and fluid is moving in the piping system. In addition, although the use of a flow rate-based approach offers many advantages, there are a number of design problems that need to be overcome in order to implement a system that can achieve substantially real-time detection of leaks, thefts, and catastrophic failures. Using devices that collect, relay or process data indicative of discrepancies between (1) an expected nominal flow rate, maximum systemic flow rate, average flow rate, actual flow rate, and fluid volume level, and (2) a corresponding measured value by the monitoring system, addresses many of the shortcomings of existing systems. Additional details relating to the interpretation of flow rate data relative to different events of interest are provided below.

Each of the dispensing pumps 32, 34 includes a totalizer 52, 54 (or FRM or AFD, not shown) meter disposed in a housing 56, 58 to measure the volume (and flow rate) of product 18 dispensed through hoses 60, 62 and nozzles 64, 66. In an embodiment, the totalizer is used in lieu of a given AFD or FRM associated with each dispenser or a given portion of the piping system. To operate dispensing pump 32, nozzle 64 is removed from housing 56, which actuates dispensing pump 32 and causes product 18 to flow through hose 60 due to the pumping action of submersible pumps 26, 28, 30. A value stored in totalizer 52 is incremented as fuel is dispensed through hose 60. Upon completion of the transaction, nozzle 64 is replaced in housing 56, thereby turning off dispensing pump 32 and discontinuing the action of submersible pumps 26, 28, 30 and totalizer 52. The operation, including the activation and termination of flow rate monitoring of a FRM or AFD is performed using similar steps to that of the totalizer's operation.

Transactions are recorded electronically by software in a sale recording device 71 connected to totalizers 52, 54 of dispensing pumps 32, 34. Totalizers 52, 54 in dispensing pumps 32, 34 are connected to sales recording device 71 by means of communications and power supply wires 78, 80. The time period associated with a given transaction and volume dispensed are also recorded in the device 71 or other system components in an embodiment.

Depending upon the product stored as well as relevant regulatory requirements, the fueling facility may also be equipped with a vapor collection monitoring device (69) that measures air-liquid ratios of recovered vapors in some systems configurations, flow performance for balance vapor recovery systems, and central vacuum unit monitoring. Such a system would also monitor pressure in the ullage space of the tank (19) by means of communications and power supply wires 81, 83, and 85 which service pressure monitors 13, 15, and 17 that have a sensor 21 mounted in the headspace of the tank.

Sales recording device 71 contains software capable of emulating the functions of a point of sale (POS) terminal associated with fuel sales made at facility 10. POS emulation software in sales recording device 71 functions on the basis of read only commands to eliminate the possibility of conflict with control commands from a POS terminal employed by facility 10.

Tank gauges 20, 22, 24 are connected to a tank monitor 82 by means of communications and power supply wires 84, 86, 88 or communicate data through radio frequency transmission. Tank monitor 82 converts raw data obtained from tank gauges 20, 22, 24 into a form usable by a computer. Similarly, the FRM's shown, such as FRM-1 and FRM-2, are either connected to a flow rate monitor 87 by means of communication links and power supply wires or communicate data through radio frequency or other types of electromagnetic wave transmission. The flow rate monitor 87 converts raw data obtained from the totalizers, flow rate meters or AFD's into a form usable by a computer. In an embodiment, the monitor 87 is a module (or processor-based application) that is resident in memory in the computer. Alternatively, the flow rate monitor can perform piping system flow rate comparisons relative to certain dispenser-driven and maximum system flow rates to detect events of interest. The monitor 87 can also receive and process pressure data from a pressure transducer in some embodiments to detect deviations from normal pressure profile data.

In an embodiment, a computer 70 contains a processor 72 capable of running various computer software applications and a memory 74 (such as RAM, ROM, hard drive, flash, or any other readable or writable memory). In an embodiment, the processor executes a monitoring application which performs various flow rate comparisons and generates alerts as outlined below. The FRM's installed in the piping system, the tank monitor 82 and sales recording device 71 are electrically connected to computer 70 to relay flow rate data, totalizer values, product height, temperature data, or other data collected by any AFD/FRM modules or other devices present in the piping system to computer 70. Software executable by processor 72 of computer 70 is capable of querying or otherwise communicating with each FRM, the flow rate monitor 87, the tank monitor 82 and sales recording device 71 to obtain measurement data at selected time intervals. In the case of the FRM's, the flow rate data is collected frequently. In an embodiment, flow rate data is monitored by the computer 70 or another remote computer (not shown) on a substantially real-time basis. The data is continuously evaluated as it is collected and is stored in memory 74 of computer 70 for later retrieval and detailed analysis.

Alternatively, computer 70 may communicate with a host processor 90 at a remote location using a client-server relationship or any type of network-based data exchange protocol. The continuous evaluations or detailed analysis of flow rate data and threshold comparisons may then be performed by host processor 90, which may be faster or more efficient than computer 70. In light of the speed of the internet, in an embodiment the real-time monitoring of the various FRM's to detect flow rate discrepancies relative to certain thresholds is performed remotely. In another embodiment, the entire flow rate monitoring and alert generation system is installed at the facility 10.

As an example, computer 70 may be a personal computer or any other proprietary microprocessor-based unit. Computer 70 may capture data automatically through direct-connect serial interfaces with tank monitor 82, flow rate monitor 87 and sales recording device 71, or by manual operator keypad entry. Computer 70 communicates with equipment at facility 10 through any suitable communication channel, whether wired, optical, wireless, or any other data transmission media. In an embodiment, a plurality of programmable serial communication ports, such as RS-232 communication ports, are used.

Computer system 70 or 90 may, for example, store and process flow rate data or other sensor generated data. The computer 70 or 90 may also perform monitoring and track events of interest based on discrepancies relating to flow rate data using a threshold, comparative, differential or other flow rate-based approach. Computer 70 or 90 may be used to produce error and analysis reports as calculated by the software. It may also have alert event-initiated capabilities, such as when a flow rate meets, fails to meet, or exceeds a threshold such as a reaction threshold. As a result, the generation of alerts in response to flow rate data can be performed using computer 70, 90, or by a given FRM or AFD device. Alerts can be generated when a leak is detected in any of the tanks or any portion of the piping system, when a sensor fails, when a gauge fails, when a theft event occurs, when a catastrophic failure occurs, or at any other event of interest.

Computer system 70 or 90 can accommodate facility and customer specific requirements while maintaining complete compatibility with other system components. Moreover, any of the data collected can be transmitted over a network, e.g., the interne, such that data collected from multiple remote locations can be processed by computers at a central location. Alternatively, computations can be carried out by on-site computers, the results transmitted over a network to a central monitoring station where results are reviewed and compared, the central stations generating reports and suggestions for improving remote site efficiency. With respect to any events of interest, whether correlated with a volume or a flow rate, alerts can include remote notifications such as emails, text messages, phone calls, visual or auditory alarms, shutting down the system, shutting down a dispenser, shutting down any device at the facility, or any other mechanism for safeguarding the facility, mitigating losses, and providing notice of the event.

In an embodiment, the flow rate-based embodiments of the invention reconcile fluid dispensing and tank flow rate data obtained from flow rate monitor 87 with data obtained from sales records. This reconciliation or comparison can be used to investigate thefts or other discrepancies in an embodiment. Sales transactions may be detected in a number of ways, including an electronic signal emitted from totalizers 52, 54, by voltage sensing of control relays on pump dispensers 32, 34, or by observation of product removal using tank gauges 20, 22, 24. Information is then continuously collected so that analysis of the collected flow rate, temperature and other data can be performed by computer 70 or host processor 90.

Several procedures are used either singly or in combination to obtain flow rate and other data and to compare such data to preset thresholds based on the characteristics of the facility's piping system, the devices installed at the facility, and which event of interest is being analyzed. First, where the system configuration provides for determining whether hoses and dispensers associated with a given tank are active, the system is queried on a minute-by-minute basis, or on the basis of another predetermined time interval, to determine the status of the dispensers. When all of the dispensers are idle, the values from totalizers 52, 54, the tank volumes (i.e., product heights in the tanks), flow rates, and temperatures are recorded.

The systems and methods of the present invention are capable of providing dynamic monitoring of system performance. Thus, flow rate monitoring and other data collection is performed continuously while normal operations, e.g., removals and deliveries, are taking place. To detect leaks dynamically, the software is programmed to detect when sales or delivery events occur and to calculate the volumes of product removed or added as a result of such activities. Thus, dynamic testing does not require that the system be dormant and addresses the entire system from the point of filling to the point of dispensing. Frequently polling dispensers to determine which are active and establishing from flow rate data if one or more of the dispensers are not recording fluid removals is a method for detecting a theft event.

Sales recorded by the totalizers 52, 54 are extracted and stored in memory 74 at times coincident with readings from tank gauges 20, 22, 24. The dispensing system is capable of transmitting a signal indicating whether or not any, all or which individual hoses are active, which information is also stored in memory 74 coincident with taking gauge and meter readings. In an embodiment, this dispensing state information is stored coincidentally with flow rate data from a given FRM or AFD such that dispensing state and flow rate data can be evaluated together.

The embodiments of the present invention are designed to achieve the maximum accuracy possible or the desired accuracy specified within the limitations imposed by the inherent random and irreducible noise in the various measuring devices incorporated. One or more embodiments utilize the monitoring of different individual and aggregate flow rates over short time periods (in substantially real-time in an embodiment) to identify events of interest such as piping system events, dispenser-related events, and other events associated with flow rate and volume discrepancies.

FIG. 2 shows a fuel storage and dispensing system that includes an underground or above ground fuel tank consistent with that shown in FIG. 1A or 1B. As shown in FIG. 2, a plurality of fluid dispensers (D1-D5) are shown operably connected to a trunk line, an AFD or FRM, a pump and a tank. In turn, a flow rate monitor 87', which may be implemented using hardware or software, is in communication with a local computer 70' or a remote computer 90'. The flow rate monitor 87' translates or otherwise relays information from an FRM or AFD for the purpose of detecting or facilitating the detection of flow rate discrepancies or other events of interest relative to certain thresholds associated with a given piping system. Alternatively, in some embodiments a flow rate monitor is not used and the AFD or FRM is directly or indirectly connected to the local computer 70', remote computer 90', or another computing or monitoring system 88'. Further, in some embodiments, the entire processing portion of the monitoring system is included within a dispenser or a portion of the piping system.

FIG. 2 represents a generalized system 10' to detect certain events of interest such as leak events, line failure events, and theft events. As part of the overall system 10' shown, a tank is operably connected to a pump, which in turn is operably connected to a trunk line with an AFD or FRM. Similar to the embodiments of FIGS. 1 and 2A, the AFD or FRM is in communication with a flow rate monitor. Alternatively, in an embodiment the AFD or FRM do not communicate with a flow rate monitor and are instead connected directly to a computer or other monitoring system 88'. The flow rate monitor 87', if a device, is in communication with or, if software, resident in memory in, either the local computer 70', the remote computer 90', or in both. The AFD or FRM is also in series with a trunk line that connects to a bank of dispensers (D1-D5). Various pressure detectors (PD) can be located within different components of the piping system, as shown.

The individual dispensers shown (D1-D5) in FIG. 2 can have individual, actual, nominal, average or maximum flow rates associated with each respective dispenser in some embodiments. Alternatively, individual fluid dispensing rates or ranges of rates can be measured for each dispenser and used by the computer-based systems described herein as a signature or specific identifier for each respective dispenser. As a result, flow rate trends over time, based on sampled flow rates, can be used to generate alerts.

Further, each dispenser includes components that allow it to be authorized to dispense and to measure the time of a given dispensing session. Thus, each dispenser can provide and receive signals that relay information with respect to its operational state (authorized, not authorized, on, off, counting, not counting, dispensing, not dispensing, and logical combinations of these different states). When a dispenser is on hook, there is no dispensing. When a dispenser is off hook, dispensing is possible when authorized or after tampering as part of a theft event. Thus, (1) on, (2) dispensing, and (3) not authorized, with the hose off hook (4), may correspond to a theft event, an error in the dispenser, or another event of interest. These different events of interest are determined using flow rate data, one or more thresholds (i.e., met, not met, or exceeded with respect to the flow rate data), and a plurality of states associated with a dispenser or another fluid transfer element in the piping system. In some embodiments, a pressure transducer is installed in the piping system and provides substantially real time pressure data, which can be evaluated to determine if a given dispenser should be authorized. If a control system detects a pressure level based on a signal from the pressure transducer that deviates from during a normal operating profile, the system can shut down flow or prevent authorization for dispensing.

As discussed in more detail below, as a changing cycle of use by customers causes the dispensers D1-D5 to be on at different times, by setting one or more thresholds for each dispenser and comparing the dispenser flow rate threshold (or combination thereof) relative to a trunk meter flow rate (or other flow rate), a FRM-determined flow rate or an AFD-determined flow rate (all of which may the same or within a measurable range of each other in a given embodiment), various alerts can be generated when a discrepancy arises between the dispenser and other flow rates. When all of the dispensers are on and dispensing, this overall flow rate is considered to be a maximum dispensing flow rate (or maximum threshold). In an embodiment, with a single storage tank, this maximum threshold can be substantially the same as the flow rate through the AFD or FRM attached to the tank as shown in FIG. 2.

In another embodiment with a single storage tank, this maximum threshold can be substantially the same as the flow rate through the AFD or FRM attached to the tank as shown in FIG. 2 subject to a periodic recalculation to address resistance of the piping system, other rate modifying components and dynamic system changes. In an embodiment, the maximum threshold is a dynamic threshold that changes as the overall system (or individual components therein) changes. This dynamic maximum threshold is a function of several parameters, which include, but are not limited to, polling frequency of the dispensers and other data generating components, characteristics of the pump controller and other piping system elements, number of dispensers, data latency, and other factors. In another embodiment, the maximum threshold for system flow rate is a function of one or more of the pumps, tanks, dispensers, and other elements in the piping system. To generalize, for an embodiment, the maximum threshold is the level of flow in the system that cannot be exceeded when the overall system is operating normally. In an embodiment, the maximum threshold value or underlying parameters can be set dynamically using flow characteristics from facility data or information from the manufacturer regarding installed dispensing facility components.

The analysis period during which a comparison of respective flow rates and a maximum threshold occurs ranges from about 5 to about 30 seconds in an embodiment. In another embodiment, a discrepancy between an AFD or FRM measured flow rate and the maximum threshold (or another threshold of interest) can be determined in a detection period that ranges from about 5 seconds to about 10 seconds. By comparing AFD or FRM flow rates relative to a maximum system threshold, an integrity check for the entire piping and dispensing system is performed, in an embodiment.

In an embodiment, the maximum threshold is a function of one or more devices, including a pump (such submersible pump) with a flow rate capacity that is throttled by all the measuring devices. Accordingly, a pump should never flow at a rate in excess of the maximum threshold. If maximum threshold is exceeded, a line failure may have occurred. As an example relating to FIG. 2, if there are 5 dispensing positions, dispensing at 30 gallons per minute, the maximum flow threshold should never exceed 150 gallons per minute. If this occurs, fluid product is being dumped into an unknown location at the facility. In an embodiment, cumulative dispenser rates equal the maximum threshold (or a multiplier thereof) for a given dispensing facility.

With respect to FIG. 2, if dispensers, D1 and D2, are flowing (dispensing product) the monitoring system 87', 88' should detect an individual dispenser flow rate of 30 gallons per minute for each dispenser or a combined 60 gallons per minute as an overall flow rate. When dispensers are dispensing and the maximum threshold is not exceeded, typically there is no issue. If, while D1 and D2 are flowing D3 is tampered with, the overall flow rate will increase to 90 gallons per minute and an alert will be generated in response to this deviation from the expected flow rate of 60 gallons per minute associated with D1 and D2. That is, the monitoring system will detect two legitimate users and one damaged or disabled dispenser corresponding to a broken dispenser element and a theft of fuel product.

Various measurement problems are complicated when two or more tanks are manifolded together as shown in FIGS. 1 and 2A (discussed in more detail below). FIG. 2A shows a complex multi-dispenser and multi-tank fluid storage and dispensing facility 10". Manifolded tanks are joined together by piping systems and serve common dispensers. Thus, sales quantities from manifolded tanks constitute withdrawals from all tanks in the manifolded system, but not necessarily in equal quantities. The inclusion of individual flow rate meters on a per tank basis can be used to address this problem in conjunction with tank gauges. Further, by monitoring which tanks are actively pumping as part of one or more dispensing events, the same maximum threshold based approaches discussed above can be applied to the facility 10".

Continuous loss of product over time, e.g. leakage, is evidenced by various flow rate discrepancies such as when the flow rate in a trunk line FRM exceeds the maximum system dispensing flow rate. Further, by knowing the physical location of a plurality of flow rate meters within a given piping system, and the allowed maximum flow rate into and out of a given piping system, deviations from these maximum flow rates, typically in the form of exceeding a given maximum threshold flow rate, allows various events of interest to be detected or inferred. As discussed throughout, local and remote computers can be used to collect data, monitor the facility, generate alerts, react to flow rate discrepancies, and trigger in response to certain thresholds being met, not met, or exceeded.

Returning to FIG. 2A, a facility 10" includes fluid injection subsystems (such as a bio-diesel injection subsystem) and a plurality of above-ground and underground components. Again, various master tank flow rate meters (meters I, II, and III) are operably connected to various underground tanks (tanks I, II, and III). Each of the underground tanks includes an automatic tank gauge (ATG) and a pump as shown in some embodiments. In addition to the three underground fuel tanks (tanks I, II, and III), a fourth injection fluid tank is shown with its own pump and ATG. The injection fluid tank includes an injection fluid, such as a bio-diesel fuel, which can be injected and mixed with fuel from the three other tanks and ultimately dispensed via one or more of the plurality of above-ground dispensers (dispensers D-A through D-P) in the dispenser bank. Each of the master tank flow rate meters are operably connected to an injection meter and an injection fluid meter. Each of the injection fluid meters measures the flow rate of the injection fluid, such as a bio-diesel fuel or additive that is being pumped from the injection fluid tank. In turn, each injection meter is shown as in series with one of the three master tank flow rate meters (meters I, II, and III) and measures the flow rate into each of the respective three groups of dispensers in the dispenser bank.

Various control and electrical components are present in certain embodiments of the above-ground portion of the facility 10". As shown in FIG. 2A, an above-ground ATG is in communication with each of the below-ground ATGs. In turn, the above-ground ATG is operably connected to an on-site processor (OSP). The OSP is connected to programmable logic controller/program logic (PLC). Typically, program logic (PC) is installed or otherwise communicating with the PLC. The PLC is connected to a high speed input (HS or HIS). In an embodiment, the HS includes a counter and relays metering information from the below-ground portion of the facility 10". The HS is connected to a flow device, as shown. The flow device can be connected to a pressure transducer. Alternatively, the pressure transducer can be directly connected to the HS or the program logic.

Further, the PLC is operably connected to a first and second digital out. The first digital out is connected to an individual dispenser alternating current supply and an individual submersible pump. The PLC is also operably connected to an on and off sensor. The on and off sensor is in turn connected to an individual injection alternative current source. The OSP is also connected to a dispenser control which in turn connects to a point of sale device. A second digital out is connected to the PLC. The role of this second digital out is to serve as an interface or controller for connecting to or receiving information from individuals or other electronic systems or devices. Thus, a remote user can access the PLC using the second digital out. Alternatively, a remote signal to activate a valve or other component can be sent to the PLC via the second digital out. In one embodiment, as shown in FIG. 2A, AC 6 refers to the number of either submersible turbine pump controller inputs (Up to 6) or the number of injection pump controllers (Up to 6) when operating together. HS Count 12 refers to the number of high speed counter inputs used in a given embodiment. The inclusion of HS Count and AC in FIG. 2A are not intended to be limiting, but only to describe an exemplary embodiment.

Figure 2B:
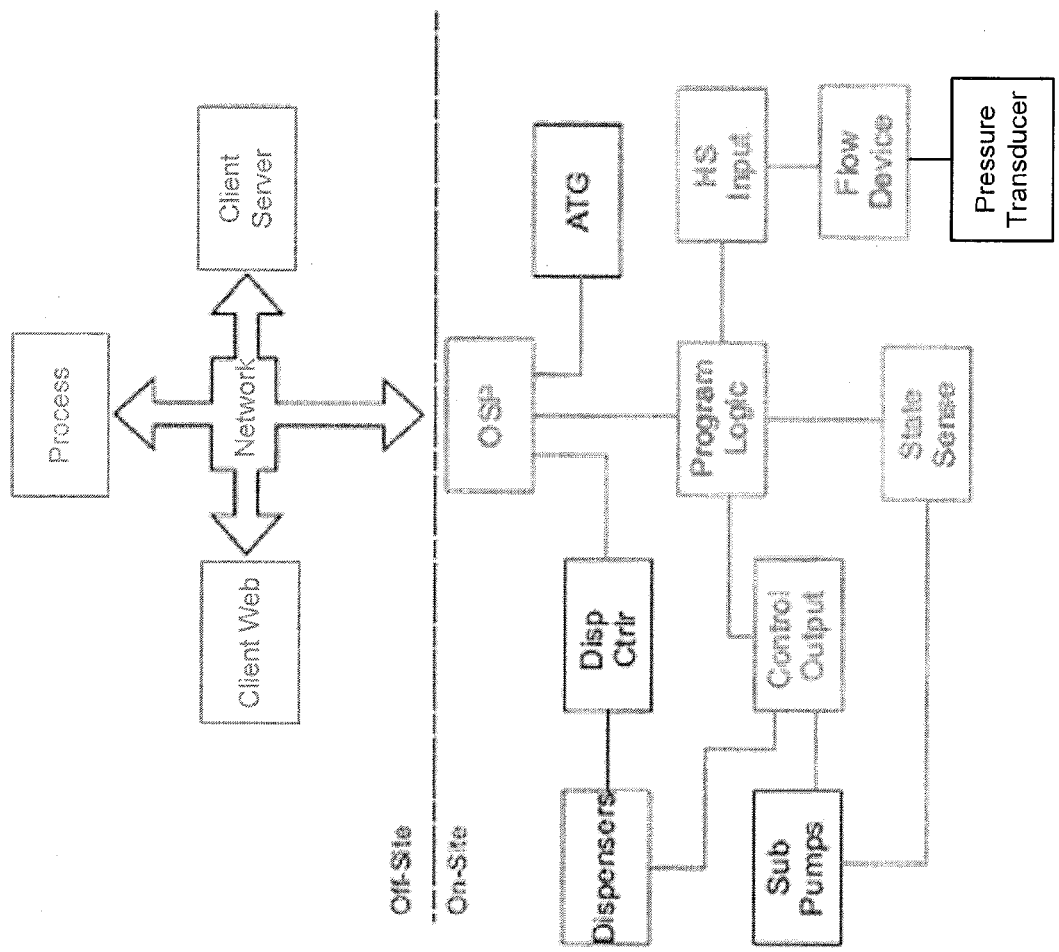
FIG. 2B is a schematic diagram of a generalized fluid and storage system that indicates on-site and off-site system components according to an illustrative embodiment of the invention.

FIG. 2B shows a system with various components suitable for performing advanced flow diagnostics for a given fluid storage and dispensing facility. Although not intending to limit the embodiment, various on-site and offsite components are shown in FIG. 2B. With respect to the on-site facility components for the embodiment of FIG. 2B, an on-site processor (OSP) represents the processing link to the off-site components as well as the data collector for various other on-site components. In an embodiment, the OSP is locally mounted personal computer running data acquisition software, communication software, and alert-generating software. The OSP includes or is operably linked to program logic. In an embodiment, the program logic is a real-time system extension of OSP equipped with multiple inputs and outputs. The OSP is also operably linked to a dispenser controller. In an embodiment, the dispenser controller is an existing device that controls the dispenser activity at the facility.

As shown in FIG. 2B, a flow device is installed at the facility. In an embodiment, the flow device is a flow measurement remote encoding mechanism used to determine the rate of flow of product entering the piping system. This may be a volumetric or a mass-based device. Further, it may be an AFD and include product quality assessment technology. A high speed (HS) input operably connects the flow device and the OSP. The high speed input counts the encoded pulse stream transmitted from one or more flow devices.

The program logic is also operably connected or linked to a state sense. In an embodiment, the state sense is a sensor or computer-based monitoring system that tracks and captures data with respect to all devices at the facility that receive, move, store, or dispense fluid. In an embodiment, the state sense is connected to all of the submersible pumps at a given facility. As shown, the optional submersible pump is an existing device that provides product to existing pressure-based dispensing devices. The submersible pump is not present at facilities in which dispenser operation is suction based.

The control output is also operably linked to the program logic. The control output controls AC power to each submersible pump and dispenser individually for shut down control in the event of catastrophic failure or theft. In an embodiment, the dispenser is a dispensing device for light motor fuels, aviation or bulk product, retail or commercial, low or high speed product measurement and flow control. The dispensing device may be pressure operated or suction operated. As shown, in the embodiment of FIG. 2A, the automatic tank gauge is a gauge that measures fuel level, water level and temperature in the underground tanks.

As shown in FIG. 2B, the various data and information of interest collected on site can be relayed and processed off-site using the OSP. The OSP communicates with a network, such as a LAN, the internet, cellular, or any other any suitable network. The client web includes one or more web based processes, which receive analysis results formatted for use in existing business processes. In an embodiment, the client server provides raw data storage, the raw data originating from the FRM's, dispensers, and other components at the facility. The components shown in FIG. 2B facilitate operating a real-time processing system that includes a remote process. This remote process can include one or more data processing applications such as OSP communication management, secure data storage, statistical analysis, analyst tools, user interfaces, notification process and web publication.

When the system is inactive, one or more volume-based technologies can be active taking data and accessing system performance since the last quiet period. In contrast to a quiet period, an active period corresponds to a time period when fluid is moving in the piping system, tank, or dispenser. In an embodiment, the system includes an on-site processor (OSP) and a programmable logic controller (PLC). The OSP communicates with the ATG, the dispenser controller and the PLC over various communication links, such as a local TCP/IP network. The OSP uses these interfaces to gather data to determine if a fault condition is present. This is achieved by comparing the amount of product stored in the system to the amount of product actively being dispensed, or flow. One advantage of the present invention is that data can be collected and used while other events are occurring, in contrast with prior approaches, in which measurements are only taken during quiet periods, such as one time at the end of the day.

Figure 2C:
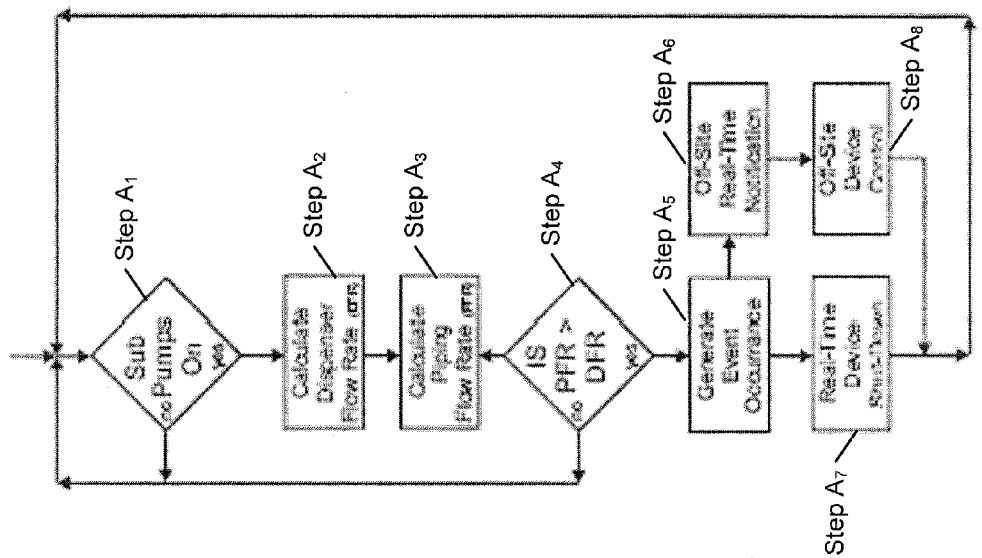
FIG. 2C is a flow diagram indicating various process steps suitable for operating a fluid dispensing and storage system according to an illustrative embodiment of the invention.

FIG. 2C shows various advanced flow diagnostic method steps as a logic diagram suitable for use in an embodiment of the invention. In general, some of the steps of FIG. 2C illustrate basic detection principles for events of interest (leaks, thefts, etc.). In an embodiment, the purpose of the monitoring system is to detect the presence of abnormal or unauthorized flow during periods of active dispensing.

Typically, methods of detection operate on data generated during periods of inactivity (or quiet periods). Product dispensing and product deliveries change the storage tanks' conditions and stored amounts. These sustained routine operations prevent a quiescently-based method from operating properly. The method depicted in FIG. 2C and the other embodiments described above address this issue and facilitate substantially real-time monitoring and alert generation.

The logic diagram of FIG. 2C illustrates one flow-rate based approach. Specifically, according to the method shown, if one or more submersible pumps are on and the system has been pressurized for dispensing, the AFD is active. Further, the active AFD and the associated processor-based monitoring program (or FRM) is examining and comparing the flow rates of the piping system so that of the sum of active dispensers to determine whether unauthorized or excessive flow is occurring. This logical flow is performed using a plurality of steps.

Initially, the OSP or other relevant monitoring software or hardware determines if certain pumps are on (Step $A_1$). If the answer is "no," then the monitoring loop continues. If the answer is "yes," the next step is to calculate a dispenser flow rate (Step $A_2$). After this flow rate calculation, another flow rate calculation is made. Specifically, the piping flow rate is calculated (Step $A_3$). Next, another decision step follows. The relevant decision is whether or not the piping flow rate (PFR) exceeds the dispenser flow rate (DFR) (Step $A_4$). If the answer is "no," then the monitoring loop continues. However, if the answer is "yes," the next step is to generate an event occurrence (Step $A_5$). In turn, once generated, the event occurrence can either be sent off-site as part of a real-time notification (Step $A_6$), or real-time device shut down (Step $A_7$) is automatically engaged at the facility. If the event occurrence is sent off-site (Step $A_6$), an off-site device control is notified (Step $A_8$), which may result in a remote controller shutting down one or more devices at the facility or engaging certain valves or controllers to prevent fluid flow in the piping system.

Figure 2D:
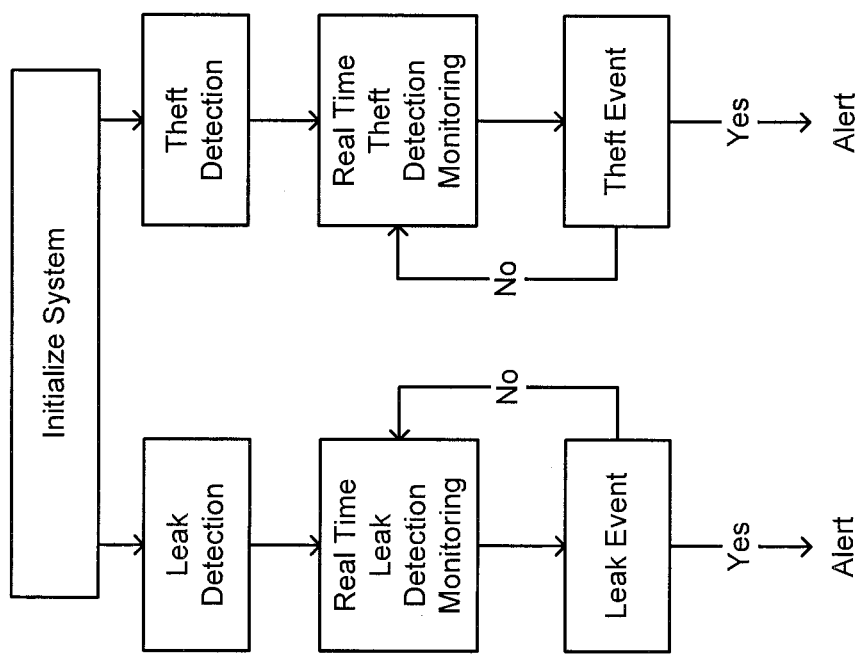
FIG. 2D is a flow diagram indicating various process steps and components for a flow rate-based theft detection and leak detection system according to an illustrative embodiment of the invention.

In addition, an exemplary process flow with various modules relating to theft detection and leak detection is shown in FIG. 2D. FIG. 2D depicts parallel detection schemes that indicate that, by using a flow rate based approach, both theft detection and leak detection can be performed simultaneously with substantially real-time detection periods. The first step is to initialize the overall monitoring system. In an embodiment, leak detection and theft detection modules are initialized as shown. However, in another embodiment one module that performs both leak detection and theft detection can be used. Once one or more of the modules are executing in parallel, a real-time monitoring loop runs for both theft and leak detection, respectively. If no leak event or theft event occurs, each monitoring loop continues to run. In the event that either a leak event or a theft event occurs (or both) an alert (or two alerts) is triggered.

In turn, the alert can be relayed to a manager via an email or electronically placed simulated phone call. Alternatively, the alert can be a trigger for sending a control signal to another part of the facility. For example, in the event of a leak, a control signal can be sent to engage a valve and prevent further fluid flow in one or more lines in the piping system. Similarly, in the event of a theft event, a signal can be sent to (1) turn off fluid flow to prevent further theft, (2) activate one or more cameras focused at a region around a dispenser where the alleged theft may be occurring to record identifying information about the alleged thief or the vehicle receiving the stolen product, (3) contact local law enforcement and request that they arrive at the facility, or combinations of the foregoing. These responses to a system alert are not intended to be limiting, but instead to provide illustrative examples relating to the operation of the monitoring system and process flows following alert generation.

Figure 3:
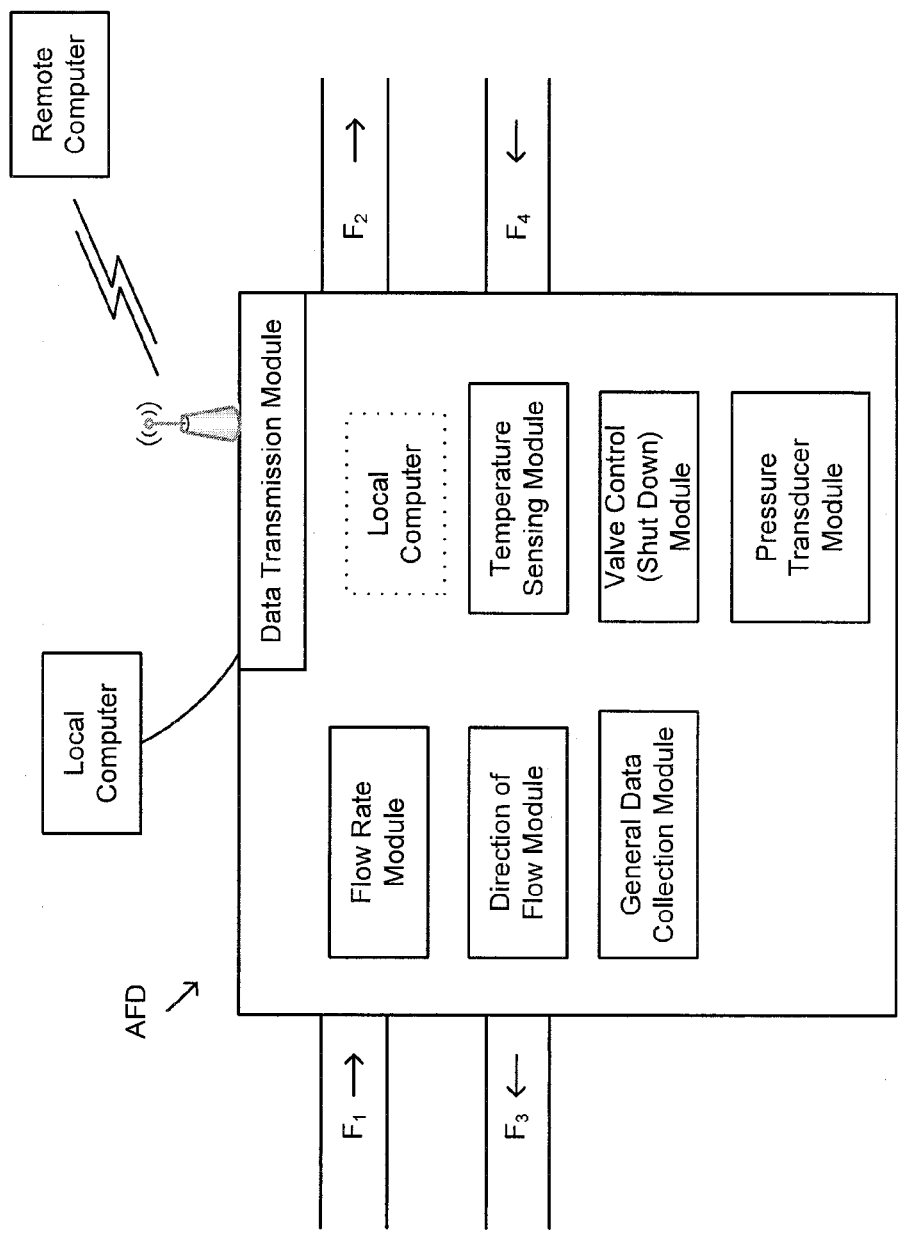
FIG. 3 is a schematic diagram of a specific flow rate monitoring and data collection device according to an illustrative embodiment of the invention.

FIG. 3 shows an advanced flow diagnostics device (AFD). In general, an AFD is a FRM that is combined with at least one other sensing, feedback, or control element or module. Although, an AFD and a FRM can be equivalent in some embodiments. As shown, in FIG. 3, the exemplary AFD shown includes one or more modules or components. The modules or components of the AFD embodiment shown can include one, some or all of the following: a flow rate meter module, a direction of flow module, a general data collection module, a local computer, a fuel marker module, a temperature sensing module, a valve control or shut down module, a pressure transducer module and a data transmission module.

As used herein, in an embodiment, a module refers to software, hardware, circuits or firmware suitable for performing a specific task or responding to a certain command, signal or instruction. Typically, in a preferred embodiment a module refers to a device, sensor, software routine, program, script, or other memory resident application suitable for receiving and processing instructions or various types of data with respect to flow rate data, meter generated pulses, temperature data, and other data relevant to the operation of a fluid storage and dispensing facility. However, the scope of the term "module" is not intended to be limiting, but rather to clarify their usage and incorporate the broadest meaning of the term as known to those of ordinary skill in the art.

Although shown as a single unitary element in FIG. 3, in some embodiments the AFD can include a plurality of the modules discussed herein distributed throughout the piping system (and not within a single housing) or overall facilities 10, 10', 10" as appropriate. In addition, although the AFD shown in FIG. 3 is depicted a multi-port device (specifically a four-port device) with fluids $F_1$ and $F_2$ flowing right to left and fluids $F_3$ and $F_4$ flowing left to right, in another embodiments the AFD may include more or less ports as appropriate for interfacing with a given piping system, such as a complex manifolded injection system. Although not shown, in one embodiment, the AFD is equipped with modules suitable for detecting back flow within a single pipe. By identifying unwanted back flow, errors in flow rate calculation can be reduced or prevented.

With respect to the AFD embodiment shown in FIG. 3, the flow rate meter module is any software, device, or subsystem for measuring fluid flow. The direction of flow module is any software, device, or subsystem for measuring the direction of fluid flow. For example, with respect to the fluids $F_1$ and $F_2$ flowing right to left and fluids $F_3$ and $F_4$ flowing left to right, the direction of flow module can detect and report such flow path directions and changes thereto. Since fluid can back up in various systems, such as an injection system, it is import for the monitoring system to be able to note when a direction of flow change occurs, even if it is to prevent an alert from being triggered. The general data collection module is any type of sensor or transducer such as a pressure sensor, an accelerometer, back up sensor, seismic detector, or any other sensor of interest. Since certain fluids, such as certain fuel products, include markers, the fuel marker module can detect the presence of certain detergents or markers to ensure the correct fluid is in the appropriate tank or moving through the correct line in a piping system.

Still referring to FIG. 3, a fuel marker module can be used to prevent diesel and non-diesel fuels from being mixed in a manifolded system. The temperature sensing module can be used to collect fluid and environmental temperature data. The valve control or shut down module is a control system module that is configured to respond to remote commands such as when an alert is triggered by a monitoring system. If one of the monitoring elements described herein detects a deviation from a maximum threshold or another threshold of interest, the monitor can be programmed to send a shut down signal to the valve control module associated with the AFD. By shutting down fluid flow within a piping system, leaks can be contained, fuel products can be directed to other locations, and theft of product can be stopped. Finally, a data transmission module allows the data collected to be sent from the AFD and for the AFD to receive signals and instructions from a remote source, such as module activation or termination signals.

As discussed throughout in some embodiments, systems and methods that operate with substantially real-time detection periods include a flow rate meter at the tank output, such as the FRM's and AFD's discussed herein. In order to identify events of interest, flow rates for individual dispensers can be computed directly using sales information and using data feeds from flow-rate meters. Both of these methods are dynamic and allow flow rates to be obtained on a substantially real-time basis. In an embodiment, a flow rate approach is paired with a volume based approach to identify a broader class of facilities problems and events.

In another embodiment, for a given set of dispensers, the nozzles are off-hook, but no product is being dispensed. This period of time when the dispenser is off hook with no fluid being dispensed can be considered a delay period or "dead time." Under these circumstances, certain thresholds and other parameters can be obtained by using such a volume-based and flow-rate based approach. With such a dual approach, individual dispenser flow rates, such as the flow rate of fluid dispensed from each of the dispensers shown in FIG. 2 (or other facility figures) are determined by regressing transaction volumes, V, on time duration, t, of dispenser hose removal from hook as follows. The column vector B lists the parameters to be estimated, such as the flow rate, estimated pumping rate, and non-dispensing elapsed time while nozzle is off hook.

$$x = \begin{pmatrix} v_1 \\ v_2 \\ \vdots \\ v_n \end{pmatrix}$$

$$y = \begin{pmatrix} t_1 \\ t_2 \\ \vdots \\ \vdots \\ t_n \end{pmatrix}$$

$$B = \begin{pmatrix} \alpha \\ \beta \end{pmatrix} = (x^T x)^{-1} x^T y$$

α=Estimated average non-dispensing time while nozzle is off-hook
β=Estimated Pumping rate Confidence Bounds of the parameter estimates may be derived as follows:

$$S^2 = \text{Variance Covariance matrix}$$
$$= (x^T x)^{-1} \frac{(y - \beta x)^T (y - \beta x)}{n - 3}$$
$$S = (S^2)^{\frac{1}{2}}$$

Confidence Bounds $$(\alpha - tS_{11}, \alpha + tS_{11})$$
$$(\beta - tS_{22}, \beta + tS_{22})$$

t=Value of t-statistic to achieve desired level of Statistical Significance.

A local computer, remote system, monitor, or other system components capable of collecting or processing data identifies which dispensers are active and computes their total throughput rate. The tank output rate is then compared to the total active dispenser throughput to identify discrepancies. The intercept term in the regression provides a measure of dead time (or a quiet period) during total transaction time. The computer-based monitoring systems described herein derive dispensing data on a near continuous temporal basis as transactions are taking place. This provides real-time analysis of dispenser rate performance. Since there are no dead times recorded using some of the real-time embodiments described herein, additional volume-based procedures can also be used to provide data during quiet periods. In an embodiment, an increase in the rate of fuel product removal from a storage tank above the known total active dispenser throughput rates signals a problem.

Advance Flow Diagnostics Embodiment Details

As described herein, in various embodiments, a system for detecting one or more faults in a piping system containing a fluid as the fluid is moving through the system (non-static diagnosis) is described. An initial assumption with this approach is that the piping system is full of fluid and has no capacity to hold additional fluid. As a result of this assumption, any amount that flows into the system must also flow out of the system somewhere. Any such outflow may be a legitimate dispensing event, a catastrophic failure of a portion of the piping system, a leak, a theft event, or some other unexpected event. Each outlet of the system has a maximum rate of flow at the maximum system pressure. At each inlet to the system there is a device, a module, or a combination thereof to measure the rate of flow of the fluid entering the system through that inlet.

The FRM's and AFD's discussed above can be used to collect the relevant data related to flow rate. A fault or event of interest is declared by a monitor when the measured rate at which product is entering the system, through all connected inlets, exceeds a reaction threshold. The local or remote computer-based systems described herein monitor the various flow rates in real-time and determine that a particular event has occurred or that a fault state exists. Once a problem is detected the computer-system performing the monitoring or a related communication system operably connected (either directly or indirectly) with the monitoring system can relay an alert to the relevant party, such as a facility 10 manager. Alternatively, the alert can be sent to a control valve or other device to stop fluid flow in a portion of the piping system.

In an embodiment, the flow rate monitoring is implemented using one or more FRM's only when fluid is moving in a portion of the piping system or device connected thereto. The monitoring system need not be local to the piping system. Thus, a remote monitoring system can receive data remotely via a direct connection or a wireless connection.

One exemplary reaction threshold is determined by summing the maximum flow rates of all the system's outlets and adding an amount for an allowable margin of error. In an embodiment, the allowable margin of error is within a statistically significant error range with respect to the confidence bounds described above. In an embodiment, if the monitoring system ever detects an amount of flow at or in excess of such a reaction threshold, under any circumstances, something is wrong. In an alternative embodiment, this limit may be set at the maximum output of the fluid sourcing device (i.e., pump) regardless of the flow capabilities of the outlets. This is applicable to scenarios where a defect in the system allows the fluid source to move product more freely than might be possible through all outlets under normal conditions. In another embodiment, the system is configured such that if product is flowing through the tank, but the flow rate in a trunk meter is below a certain minimum threshold, an alert is generated because there may be a fault in the trunk line at a position before the AFD or FRM installed in the trunk line.

Typically, one type of a monitoring system embodiment is constructed such that the flow through each inlet is measured by some in-line metering device (located somewhere in the piping system). In another embodiment, the inlet flow rates are calculated, not with an inline meter, but based on the rate that a fluid product is removed from each inlet's fluid source reservoir. In an exemplary fuel station scenario, computing the rate of product leaving the fuel storage tanks is performed to determine flow rates. An additional error state can then be declared when metered inflow exceeds the fluid source's declared theoretical limit or empirically determined limit. A further variation of this embodiment facilitates handling start-up and shut-down states during which abnormal flow may occur as the system initializes or leaves its normal flow state. For example, in service stations, due to air in lines an abnormal surge of flow at start up can occur. In addition, when pumps are stopped, there might be backwards flow on shutdown. These events can be handled by incorporating the atypical scenarios at start and shutdown as logical programming within appropriate parts of the systems, methods, and devices described herein.

Flow Based Analysis, with Outlet on/Off Data

In an embodiment, the reaction threshold (or maximum threshold) is determined or modified in realtime. Changes are made to the threshold of interest upon determining that one or more outlets are closed and not being used. From such a determination relating to a change in the characteristics of the overall dispensing system, the limit for maximum possible flow is adjusted accordingly based on the physical changes that occurred. As a result, the thresholds used in some embodiments are dispenser-driven thresholds. This would be the case in certain service station embodiments. As dispensers (alternatively, outlets) are enabled, their potential flow would be added to the allowed threshold. In general, various embodiments track changes in the state of the pumps, tanks, dispensers, and other elements at the facility to update the reaction threshold or other thresholds over time.

A further enhancement can be implemented by modifying each outlet's maximum flow rate based on historical data. Further, the maximum flow can also be modified based on limitations of the fluid source to supply a sufficient pressure level depending on various parameters and conditions such as, for example, including the number of outlets that are open. Based on these considerations, the maximum flow rate of outlets may change in different ways depending on the characteristics of each particular outlet.

In an embodiment, the sampling time for flow rate calculations is used as a parameter by the various processing and monitoring devices described herein. If, over the duration of a sampling period, an outlet is open for only a fraction of that sampling time, that outlet's maximum flow rate, used for threshold determination, can be adjusted by that same fraction (i.e., if a given dispenser is busy for only one minute of a five minute sample period, the threshold would allow only $1/5^{th}$ of that dispenser's maximum flow rate). In an embodiment, the reaction threshold is set near zero for the case where no outlets are open (i.e., no dispensers are active).

Flow Based Analysis, with Outlet Intra-Sale Flow Data

In another embodiment, monitoring fluid flow through each outlet by means of a flow measuring device such as the multi-AFD or FRM embodiments discussed above offers certain enhancement relative to single AFD or FRM installations. Under these circumstances, the reaction threshold is modified based on the measured flow through each outlet. If flow rate for a particular outlet is known, based on actual measurement, that flow rate can be used to update the processing and monitoring systems such that the overall flow limit can be set with great accuracy. For example, in a service station, each ongoing transaction would be monitored to determine each dispenser's contribution to the overall flow. In an embodiment, an FRM would be coupled to each dispenser. Although, when an error or alert is generated because a maximum flow value is exceeded, the dispensers' flows must be checked to make sure that the problem is not excessive flow caused by over-pressurization instead of a line leak.

Computing System Embodiments

Figure 4:
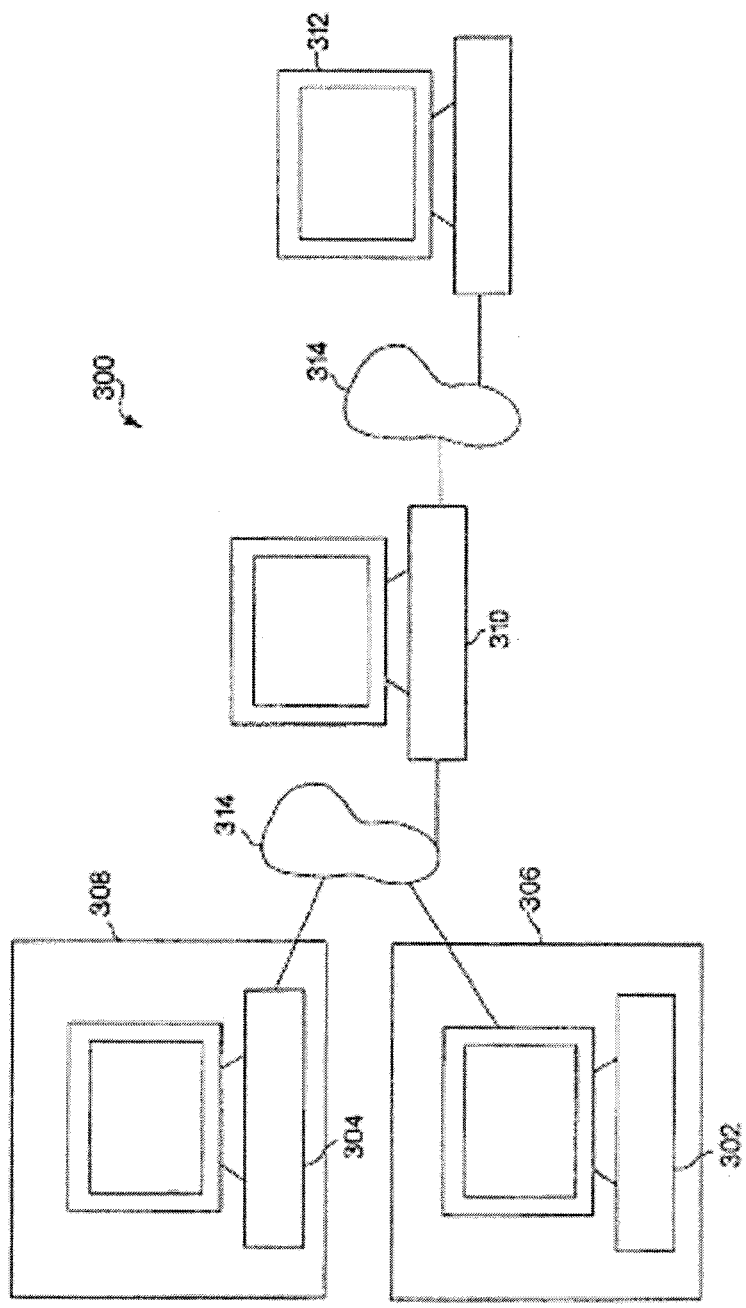
FIG. 4 is a schematic diagram of a data acquisition and transmission network that may be used in conjunction with a fluid dispensing and storage system according to an illustrative embodiment of the invention.

Since both local and remote computers and a single computer can perform the monitoring and data processing tasks described herein, it is useful to implement a network-based approach to use remote and local computers to efficiently archive and use data generated at a given facility. Specifically, referring now to FIG. 4, the invention incorporates a data acquisition and transmission network (DAT network) 300 to automate the process of obtaining, capturing, transferring and processing flow rate data, module-collected data, failure events, leak events, and other events of interest for use in generating alerts. The network is configured to also allow a facility manager to have real-time data via local or remote computer-based user interfaces. DAT network 300 includes on-site processors 302, 304 at the facilities 306, 308 where the tanks are located, a customer host processor 310 and a remote processing device 312.

In an embodiment, DAT network 300 links multiple remote facilities 306, 308 to remote processing device 312, which performs various data analysis and processing tasks. Exemplary tasks performed by the remote processing device include, but are not limited to (1) collecting data generated by FRM's, AFD's, and other sensors installed at the facility; (2) processing the collected data or subsets thereof; (3) activating cameras positioned at the facility when a theft event occurs; (4) generating triggers or alerts in response to thresholds being exceeded, not met, or met; (5) tracking dispenser state information; (6) calculating, updating and monitoring flow-based thresholds of interest; and the other processing and monitoring methods and tasks described herein. The link may be accomplished indirectly through customer host processor 310, which itself is connected to a plurality of remote facilities 306, 308.

In an embodiment, each of these processor elements is composed of independently operating software and hardware systems which form the basis of a wide area network linked by data transmission devices which transmit information electronically via the telephone or communications network 314 using standard dial-up voice grade telephone lines, satellite or cellular communication, optical fibers, POTS lines, or broadband access. Examples of DAT networks are the TeleSIRA and EECOSIRA systems developed by Warren Rogers Associates, Inc., Middletown, R.I. and the PetroNetwork S3 system developed by Warren Rogers Associates, G. P. of Nashville, Tenn.

DAT network 300 provides a uniform method of integrated management for the widest possible variation of underground and above-ground fuel storage, movement and measurement systems. On-site processors 302, 304 are capable of obtaining information from any electronic or mechanical control system, enabling DAT network 300 to accommodate facility configurations that are unique to each facility while presenting the information captured at remote facilities 306, 308 to customer host processor 310 or remote processing device 312 in a uniform format. In an embodiment, the DAT network is implemented over the internet using available protocols and devices.

On-line processors 302, 304 obtain and capture product inventory data and flow rate data through the use of proprietary interfaces with external systems in use at remote facility 306, 308, such as AFD's, FRM's, tank gauges and sales recording devices. On-line processors 302, 304 transfer captured information daily, weekly or monthly through the public switched telephone network 314 (or the internet) to customer host processor 310 or remote processing device 312 for use in inventory management, delivery scheduling and/or flow rate and reaction threshold comparisons. On-site processors 302, 304 may be, e.g., touch-tone telephones acting as sending units and multi-line, voice prompt/response computers as the receiving units. On-site processors 302, 304 may be designed to meet the specific needs of facilities 306, 308 without requiring remote hardware at the facility in addition to that already present.

In particular, each of on-site processors 302, 304 may be equipped with an alphanumeric keypad, a character display, a power supply, multiple programmable serial ports, multiple discreet inputs, multiple discreet outputs, a local printer port (for connection to a printer) and one or more communication ports capable of supporting remote communication. Additionally, each of on-site processors 302, 304 may be equipped with a telecommunication means. Examples include, but are not limited to internal or external auto-dial/auto-answer (AD/AA) modem and/or internal communication support that accesses broadband, narrowband and/or wireless low-speed or high-speed communications connections of any type. The keypad and display allow for operator configuration and manual entry of sales, delivery, tank level, or supplemental data.

While use of an AD/AA modem allows an on-site processors 302, 302 to share an existing telephone line with other devices that use the same line by establishing communications windows, or use distinctive rings or intelligent answering devices to minimize attempted simultaneous use or simultaneous answer. The use of any type of telecommunication means that supports an "always on connection," such as, but not limited to, cable, optical fiber, any form of DSL, frame relay, ISDN or satellite, will enable frequent or continuous communication to be maintained. Each of the programmable serial communications ports is independent, fully programmable and governed by options selected at the facility or off-site through remote configuration access. Finally, on-site processors 302, 304 can prompt the facility operator to enter or verify missing, corrupted or suspect data by manual entry when results of a screening procedure or analysis is performed, either on-site or off-site, on the data automatically captured and the results of the screening or analysis are outside the expected range or when supplemental data is required to complete the analysis.

The use of customer host processor 310, which is capable of receiving, storing and processing information from multiple on-site processors 302, 304, enables the management of a remote tank, AFD, and FRM population from a single point of contact. A database of information created by customer host processor 310 is the basis for all higher level product management functions performed by DAT network 300. In an embodiment, the database is also the basis for the flow rate and reaction threshold comparative analysis performed by remote processing device 312.

The use of remote processing device 312, which is capable of receiving, storing and processing the information in the database created by customer host processor 310 for product management enables DAT network 300 to achieve maximum results by utilizing the database for flow rate and reaction threshold comparisons without additional remote facility information or communication. Remote processing device 312 is capable of transmitting a resulting database of a flow rate analysis back to customer host processor 310 for printing and other customer record-keeping requirements.

The processor elements of DAT network 300 may exhibit other useful operational characteristics. To prevent unauthorized access to DAT network 300, a security access code for dial-up data transfer functions is required. Under secured access, the baud rate, parity, stop bit parameters and communication protocol are determined at any of on-site processors 302, 304, customer host processor 310 or remote processing device 312. Another function of DAT network 300 is to monitor tank contents and FRM-measured flow rates throughout a given piping system. DAT network 300 can be programmed to activate, e.g., an audible and/or visual alert if a tank parameter changes or if flow rates (or preset thresholds) are being exceeded.

Figure 5:
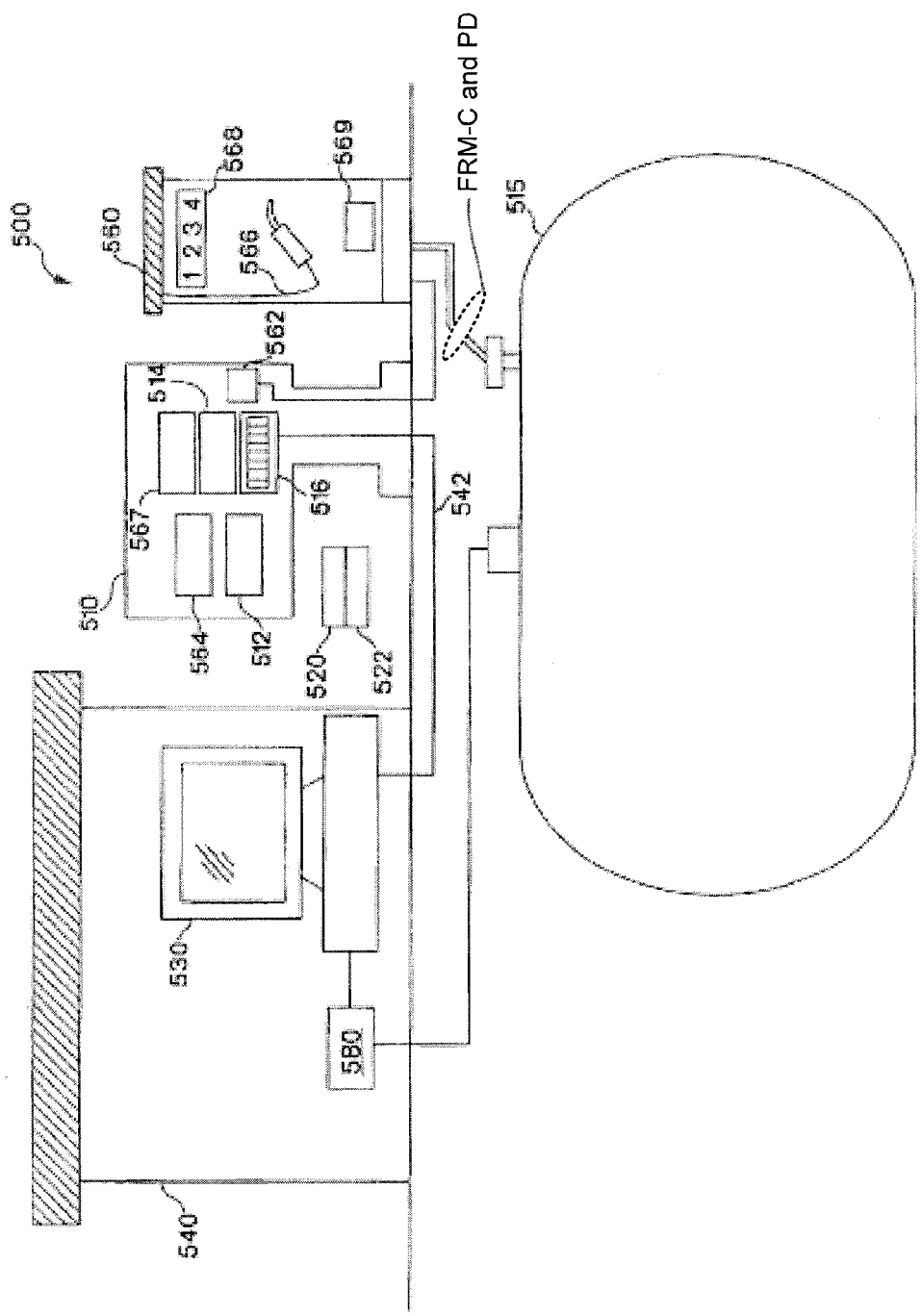
FIG. 5 is a schematic diagram of an underground storage tank facility including a fuel access control unit according to an illustrative embodiment of the invention.

As shown in FIG. 5, a DAT network may include a fuel access control unit or system 510 at a storage tank facility 500 such as a UST automobile fueling facility. A flow rate meter FRM-C (or AFD, not shown) is one element in the facility 500. A pressure detector/pressure transducer (PD) is another element of the facility 500. Fuel access control unit 510 is a dispensing system actuated by the use of a device coded with information, e.g., a card 520 with a coded magnetic stripe 522, e.g., an optical punched card, an electrically erasable programmable read-only memory (EEPROM) key, a radio frequency identification (RFID) tag, a magnetic resonance coupler, a bar code, or other type of coded medium which contains identification information pertaining to the user. In an embodiment, FRM-C is disposed within unit 510. Fuel access control unit 510 may include apparatus for a user to input information, e.g., a card reader 512, a display 514, and a keypad 516, a control, system 562 for turning a fueling dispenser 560 on and off, and a processor 564 or similar computing platform for controlling and monitoring the user's fueling process. Manufacturers of fuel access control system which rely upon optical reading devices or magnetic stripe card reading devices to identify the user include FillRite, Fuel Master, Gasboy, PetroVend and Trak Engineering.

Fuel access control unit 510 is used to monitor the activity of fueling dispenser 560. Fueling dispenser 560 includes a hose 566 for dispensing fuel from a tank 515, a totalizer 568 and a meter 569 for measuring the volume of fuel dispensed by hose 566. In an embodiment, the control unit 510 transmits information relating to the state of the dispenser (off-hook, idle, dispensing, error, etc.) that can be used in conjunction with a flow rate monitor to detect events of interest, such as a theft event. Fuel access control unit 510 may communicate with an on-site processor 530 located inside facility building 540 over a local area network (LAN). The communications between fuel access control unit 510 and on-site processor 530 may be over RS-232/RS-485/RS-485 (MultiDrop) cabling 542.

Fuel access control unit 510 provides a system of controlling access to fueling facility 500 by determining the identity of each user of the facility and screening each user based on his or her authority to purchase fuel. Identification of the user is made by requiring the user to present a valid magnetic card (e.g., card 520), an optical punched card, an EEPROM key, an RFID tag, a magnetic resonance coupler, a bar code, or other type of coded medium, which contains identification information pertaining to the user. Such fuel access control systems are referred to as island control units or a cardlock system. Further, the user may be required to present additional identifying data by other means such as buttons, key switches, or by entering information on keypad 516. Once the identification data is collected, fuel access control unit 510 determines the user's fueling privileges, and based on this information will either allow or deny fueling by the user. If fueling is allowed, fuel access control unit 510 will enable dispensing pump 560 for that particular user and monitor the fueling process. At the completion of the fueling process, fuel access control unit 510 will record the amount of the fueling transaction in a memory 567 and retain the recorded information for further accounting of the transaction.

Fuel access control unit 510 may be used to perform a variety of functions, including the following:

- Identifying the user by reading a card or other coded medium and collecting the user's identification information such as a driver license number or other personal data. This information can be relayed to the facility owner or authorities when a theft event is detected.
- Collecting other pertinent data for analysis, such as an identification of the user's vehicle, the vehicle's odometer reading, a trip number, the trailer hub counter, the engine hour reading and/or a refrigerator unit hour reading. This information can be relayed to the facility owner or authorities when a theft event is detected.
- Making authorization decisions, to determine whether the identified user is permitted to obtain fuel. If a previous theft event has been associated with a particular user, that information can be archived at a remote central computer that oversees all of the facilities in the region. If a user has stolen in the past, this information can be used to activate cameras or otherwise initialize the theft detection system at the current site or alert the site manager.
- Calculate or otherwise monitor flow rate data, dispensing session time, volume dispensed, and other data of interest.
- Controlling the maximum amount dispensed. If there is an error in the dispenser or a flow rate discrepancy is detected, stopping dispenser operation or regulating fuel dispensing levels may be desirable in some embodiments.
- Reporting the fueling transaction to a processing location for inventory analysis or other analysis.

Referring again to FIG. 5, there are two types of authorization procedures for determining whether an identified user is permitted to obtain fuel from a fueling facility. Fuel access control unit 510 may use either or both of these authorization procedures. For the first method of authorization, external authorization, fuel access control unit 510 collects the user's information and forwards the collected information to an outside agent to make a final decision as to whether or not the identified user is permitted to obtain fuel from fueling facility 500. The outside agent may return an approval, along with fueling parameters (i.e., a maximum amount), or a denial. Fuel access control unit 510 will then inform the user whether or not fuel may be obtained. The outside agent may be connected to fuel access control unit 510 via a dial-up telephone line, a LAN or a direct communication link. Using the dispenser driven threshold approaches discussed above, the flow rate monitor or computers 70, 70', 90, 90' are operably connected to the control unit 510 in some embodiments. As a result, when a discrepancy is detected relating to a dispenser threshold as a function of flow rate data, in addition to generating an alert, a signal can be relayed to the control unit that denies user access and prevents fuel from being dispensed or activates a camera in or near the dispensing unit 510.

For the second method of authorization, internal authorization, fuel access control unit 510 collects the user's information and compares the collected information to a data table stored locally to make the final decision as to whether or not to allow fueling. The locally stored table may return an approval, along with fueling parameters (i.e., a maximum amount), or a denial. Fuel access control unit 510 will then inform the user whether or not fuel may be obtained. The locally stored table may be housed directly in fuel access control unit 510, in a control device at the fueling facility such as on-site processor 530 or carried on the access medium (e.g., card 520) used to request fueling authorization. The locally stored table may also be imbedded directly in fuel access control unit 510 or accessed via a LAN inside the fueling facility's building 540.

Fuel access control unit 510 functions as an additional point of sale (POS) device, similar to sales recording device 71 (FIG. 1). Fuel access control unit 510 responds to requests for hose status and totalizer and meter values in the same manner as a POS device. Fuel access control unit 510 also monitors each hose 566 and tracks status changes in the hose, including indications that the hose is idle, that a request for access is in process, that the use of hose 566 has been authorized, that the hose has been taken off its hook, that dispensing pump 560 is dispensing fuel with hose 566 removed from its hook, and that the dispensing pump has been turned off and the hose is idle again. Again, these states can be used to detect theft events and other events of interest.

Each detailed transaction that is completed by fuel access control unit 510 may be retrieved by on-site processor 530 from memory 567 upon completion of the transaction. The transaction information may be stored in processor 530 for further analysis. Further, based on the stored, detailed transaction information, a detailed site dispensing audit can be performed. Such a site dispensing audit would determine whether the volume claimed to be dispensed by fuel access control unit 510 actually represents the volume change in the UST or AST during the same period as calculated by on-site processor 530.

In conventional cardlock applications as well as other transaction authorization procedures, the processing methods assume that the volume as determined by fuel access control unit 510 is accurate, but have no way of determining if any errors in calculating the volume have occurred. A fuel access control system interfaced directly with an on-site processor 530 that receives data from an automatic tank gauge 580 may also experience similar errors associated with conventional inventory control practices. By contrast, an enhanced, integrated fuel access control unit 510 may include an accurate analysis of the state of hose 566. Such an integrated fuel access control unit 510 may avoid the occurrence of dispensing pump 560 being properly accessed and enabled by authorization control system 562, but appearing not to be dispensing fuel. From the point of view of fuel access control unit 510, the user may have simply changed his mind about purchasing fuel. However, from the perspective of on-site processor 530, a determination can be made about the dispensing pump's activity by analyzing the tank activity and comparing that information to the activity of totalizer 568 and meter 569. Further, although other hoses may be actively dispensing fuel during the same period, on-site processor 530 may track all hose activity independently for analysis.

Temperature Adjustment

The traditional approach to the problem of temperature induced volume change is to compute net volumes that are volumes adjusted from the measured gross volume to what it would be at sixty degrees Celsius or fifteen degrees Celsius. There are problems associated with this approach, particularly at high volume multi-manifolded tank sites such as that shown in FIG. 2A.

Temperatures are measured only in the tanks and are typically averaged from multiple thermistors. In order to reconcile sales and tank volumes, sales must also be adjusted to net. There is, however, no means of determining which or how many of the between tank and in tank temperatures to use. There is also no means of identifying temperature effects in the piping en route from tank to dispenser. A further inaccuracy occurs because of the potentially extended periods at very active sites between inactive times when reconciliations are made. The temperature will typically change during that time but the affected residual volumes from continuing sales are not recorded.

The system overcomes this by performing frequent measurements of tank temperatures and volumes taken independent of transaction status. The temperature induces volume changes are then aggregated between reconciliations and are then incorporated into the balance calculation when transactions are complete. In this way gross sales and temperature adjusted gross volumes in all tanks are reconciled. By proceeding in this manner, all temperature adjustments are made to in-tank volumes independently of sales. Real gross temperature adjusted gauged volumes are thus compared to gross sales. The AFD's described herein can be used to collect large volumes of temperature data over time.

En Route Temperature Adjustment

In another embodiment, the system identifies when actual measured deliveries from a dispensing terminal to storage site are less that the invoiced volumes. To support a claim against the supplier it is necessary to determine the volume, if any, of shrinkages induced by temperature change in the transporter while en route to the storage site.

By invoking the principle of conservation of heat energy, the product temperature in the transport on arrival at the site and prior to delivery into the tank can be determined. This is done by symbolically combining the heat energies in the storage tank prior to delivery and in the transport. Equating that heat energy total to the heat energy in the mixture after delivery allows the system to determine algebraically the unknown in-transport temperature.

The temperature difference between that recorded on the invoice at the supplier terminal and in the transport on arrival at the site can then be determined and from it and the invoiced volume, the en route shrinkage due to temperature alone is determined. The AFD's described above can facilitate some of the underlying data collection required to evaluate these temperature differences.

Pressure Detector Embodiments and Methods

One embodiment of the invention relates to transactional behavior analysis. In one implementation, transactional behavior analysis relates to monitoring a dispenser as transactions occur (or before they occur) to enhance the safety or security of a dispensing facility. A method for implementation of this embodiment performs a monitoring or data analysis function such that a processor or other device shuts down a dispenser where a likely theft is taking place. This feature relates to a site design where there is a flow-meter at the discharge outlet of the tank. However, as part of this site design, an independent flow meter is not required beneath the individual dispenser positions.

For a given dispensing site, there are a number of dispensers associated with a tank or piping system. Accordingly, it is useful to identify a particular dispenser that is experiencing actual flow of product such that the flow is not being counted or otherwise tracked. This uncounted or uncheck flow can be associated with a theft event. Identifying theft events are one feature of the invention.

Sometimes a theft event involves a thief having an authorization provided at a particular fueling position (such as a particular dispenser). The authorization is achieved by either prepaying for a small amount of fuel or using a debit/credit/loyalty card swipe to begin a transaction. Typically, once the transaction starts, the thief then disables the dispenser. In this way, only a relatively small amount of product has been dispensed and tracked.

In order to determine which dispenser is experiencing a theft event, a local or remote processor (or other device) determines various operational or transitional states or steps. These steps or states can include, but are not limited to each of or combinations of the following:

(1) A state in which flow from a tank exceeds the amount of inter-transactional sales that are being counted by the dispensers.

(2) A state in which dispensers are experiencing inter-transactional sales when an abnormal flow condition has been detected and eliminating such sales from consideration for potential shut down.

(3) Performing the step of identifying those dispensers that have experienced inter-transactional sales in the period immediately prior to the abnormal flow condition.

(4) Performing the step of remotely shutting down a dispenser, in the event one or more of the following conditions have been met or are predicted to occur:

detecting inter-transactional sales in a period prior to an abnormal flow condition; and/or tallying sales amounts significantly less than had been previously logged for that dispenser position; and/or experiencing an abrupt change from full-flow as determined by inter-transactional sales counts without tapering to a slow dispenser flow condition characteristic of the cessation of a transaction.

Another embodiment of the invention relates to the inclusion of a pressure transducer in a line of the piping system. In a preferred embodiment, the pressure transducer is positioned at the discharge end of the flow meter near a tank. The pressure transducer provides a mechanism to identify a break or other event in a fueling line while fueling transactions are taking place. Accordingly, the use of a pressure transducer monitors the pressure in a fuel line to detect increases or decreases in pressure relative to known thresholds as well as relative to various alarm or alert thresholds that are correlated with an event of interest, such as a leak or theft.

Pressure Transducer Data and Applications Thereof

Currently, regulated tank systems are required to have catastrophic leak detection for lines to detect emergent large losses (above routine monitoring thresholds) over a relatively brief time span. By regulation, this "catastrophic" line leak detection system is required to detect a leak of about three gallons per hour at about 10 psi. Such systems exist (and incorporate pressure transducers) but only work when the lines are idle. For example, a tank system will have all dispenser positions idle, but also should have retained residual line pressure if there has not been a breach of the line itself.

When a submersible turbine pump is engaged because there has been an authorization of a transaction, the currently available line leak detectors will sample the residual pressure in the lines to determine if there has been a loss of pressure before allowing there to be flow in the line. There is time for the test because there is a lag time between when the submersible turbine pump is engaged and the solenoid valve opens in the dispenser to permit flow to a through a dispenser to a vehicle or other fuel storage device. If there is inadequate pressure in the line, the line leak detector will restrict or shut off flow into the piping system.

Over time, retail fuel dispensing facility throughput has increased. Therefore, as a result, there are extended periods when the lines are not idle because there is always a dispenser in use. This is an emergent problem because the submersible turbine pumps and associated line leak detectors cannot detect an emergent loss when the lines are in a flow condition or flow state. In one embodiment of the invention, a pressure transducer can be used to identify an emergent line leak when the tank system is in a flow condition or flow state.

With respect to the AFD systems and methods described above, such system and method embodiments can identify the dispensers and the associated flow rates when the tank system is active. By including a pressure transducer in the line, a processor or other device can also log, track or monitor operating pressure in the associated lines as well as the number of dispensers in use. The processor logs a compendium of characteristic line pressures associated with the various numbers of dispensers in use. On an ongoing basis, while the system is in a flow condition, the values recorded by the pressure transducer are recorded and the number of dispensers in active use is also recorded. In one embodiment, the system and method embodiments using a pressure transducer can generate a line leak alert if one, some or all of the following observations are recorded:

1. (Event 1): The operating pressure in the line during a flow condition is less than the characteristic operating pressure of the flow in the lines given the number of dispensers in use.
2. (Event 2) is occurring and the associated flow meter is recording more fuel product being introduced to the line than that being recorded through the dispensers.
3. Event 1, Event 2 or both are occurring and the transactional behavior analysis is consistent with normal operating parameters of the system.

Additional Embodiments and System Components

The device, software, methods, and systems described herein can incorporate various network-based technologies. In various embodiments, suitable network-based technologies for transmitting and receiving data, such as flow rate and threshold data, and processed versions thereof include, but are not limited to cellular, infrared (IR), satellite, Bluetooth, wide area network (WAN) and WLAN, Wireless Fidelity (Wi-Fi) such as 802.x standardized systems and are to be used generically when referring of any type of 802.11 network, whether IEEE 802.11b, 802.11a, 802.16, 802.20 dual-band, GPRS, CDMA, EDGE, WCDMA, CDMA2000, TD-SCDMA network, UWB/W-USB, ZigBee, NFC and WiMax.

Embodiments may operate over current mobile communication networks based on either Code Division Multiple Access (CDMA) or Global Systems Mobile (GSM) standards, or other systems. The device network and the internet can be accessed using various protocols and auxiliary networks, including the suitable network-based technologies discussed above.

Servers suitable for performing the processing, routing, transmission, and archiving of data generated by meters, gauges, AFD's, FRM's, and other piping system components can use a windows-based operating system, a Mac based, a Linux-based operating system, or any other suitable open source or proprietary operating system.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system.

Memory may also include any means for storing software or other instructions including, for example and without limitation, a hard disk, an optical disk, floppy disk, DVD (digital versatile disc), CD (compact disc), memory stick, ROM (read only memory), RAM (random access memory), DRAM (dynamic random access memory), PROM (programmable ROM), EEPROM (extended erasable PROM), and/or other like computer-readable media.

In general, computer-readable memory media applied in association with embodiments of the invention described herein may include any memory medium capable of storing instructions executed by a programmable apparatus. Where applicable, method steps described herein may be embodied or executed as instructions stored on a computer-readable memory medium or memory media. These instructions may be software embodied in various programming languages such as C++, C, Java, and/or a variety of other kinds of software programming languages that may be applied to create instructions in accordance with embodiments of the invention.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

The methods and systems described herein can be performed in software on general purpose computers, servers, or other processors, with appropriate magnetic, optical or other storage that is part of the computer or server or connected thereto, such as with a bus. The processes can also be carried out in whole or in part in a combination of hardware and software, such as with application specific integrated circuits. The software can be stored in one or more computers, servers, or other appropriate devices, and can also be kept on a removable storage media, such as a magnetic or optical disks.

It should be understood that the order of the steps of the methods of the invention is immaterial so long as the invention remains operable. Moreover, two or more steps may be conducted simultaneously or in a different order than recited herein unless otherwise specified.

The use of sections or headings in the application is not meant to limit the invention; each section and heading can apply to any aspect, embodiment, or feature of the invention.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

In the application, where an element or component is said to be included in and/or selected from a list of recited elements or components, it should be understood that the element or component can be any one of the recited elements or components, or can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

It should be appreciated that various aspects of the claimed invention are directed to subsets and substeps of the techniques disclosed herein. Further, the terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Accordingly, what is desired to be secured by Letters Patent is the invention as defined and differentiated in the following claims, including all equivalents.

What is claimed is:

1. A processor-based system for monitoring a fluid dispensing system having a storage tank and a piping system, the piping system having a maximum output flow rate threshold, the processor-based system comprising:
    a dispenser configured to dispense fluid from the fluid dispensing system during a dispensing time interval;
    a metering device in fluid communication with piping system, the metering device configured to measure a plurality of sample flow rates over time in response to fluid passing through the metering device; and
    a processor for executing a monitoring application that generates an alert within a substantially real-time period in response to an event of interest, the monitoring application comparing the maximum output flow rate threshold to the plurality of sample flow rates over time to generate the alert when at least one of the sample flow rates exceeds the maximum output flow rate threshold, and wherein the monitoring application is configured to operate during active periods of dispensing fluid from the fluid dispensing system,
    wherein the dispenser comprises a dispenser metering device, and
    wherein the monitoring application generates a dispensing alert when a piping system flow rate measured at the metering device is greater than a dispensing flow rate measured at the dispenser metering device.

2. The system of claim 1 wherein the substantially real-time period ranges from about 5 seconds to about 90 seconds.

3. The system of claim 1 wherein the metering device is an advanced flow device, the advanced flow device comprising a module selected from the group consisting of a flow rate module, a temperature sensing module, a direction of flow module, a shut down module, and a data collection module.

4. The system of claim 1 wherein the monitoring application generates an event of interest alert when the dispenser is not authorized in an off-hook state and at least one flow rate at the metering device is greater than the maximum output flow rate threshold.

5. The system of claim 1 wherein the dispenser has a state and wherein the processor is configured to determine a modified maximum output flow rate threshold when the state changes.

6. A processor-based system for monitoring a fluid dispensing system having a piping system, the piping system having a maximum output flow rate threshold, the processor-based system comprising:

a tank for storing the fluid;

a plurality of flow rate metering modules for providing, at a plurality of times, data indicative of fluid flow rate; and a processor for receiving the data from the metering modules, calculating a flow rate value at each of the plurality of times, calculating a flow rate difference between the maximum output flow rate and the flow rate metering module indicated flow rate at each of the plurality of times, and generating an alert corresponding to an event of interest when the flow rate difference indicates the maximum output flow rate threshold has been exceeded, wherein one of the plurality of flow rate metering modules is disposed in a trunk line of the piping system and another one of the plurality of flow rate metering modules is disposed within a dispenser in fluid communication with the piping system.

7. The system of claim 6 wherein the processor generates alerts within a substantially real-time period.

8. The system of claim 7 wherein the substantially real-time period ranges from about 5 seconds to about 90 seconds.

9. The system of claim 6 wherein one of the plurality of flow rate metering modules is an advanced flow device, the advanced flow device comprising a module selected from the group consisting of a flow rate module, a temperature sensing module, a direction of flow module, a shut down module, and a data collection module.

10. The system of claim 6 wherein the event of interest is selected from the group consisting of a line leak, a tank leak, a theft, and a dispenser error.

11. A processor-based system for monitoring a fluid dispensing system having a storage tank and a piping system, the piping system having a maximum output flow rate threshold, the processor-based system comprising:

a dispenser configured to dispense fluid from the fluid dispensing system during a dispensing time interval;

a metering device in fluid communication with piping system, the metering device configured to measure a plurality of sample flow rates over time in response to fluid passing through the metering device, wherein the metering device is positioned in a trunk line, the trunk line being disposed in the piping system between the storage tank and the dispenser; and a processor for executing a monitoring application that generates an alert within a substantially real-time period in response to an event of interest, the monitoring application comparing the maximum output flow rate threshold to the plurality of sample flow rates over time to generate the alert when at least one of the sample flow rates exceeds the maximum output flow rate threshold, and wherein the monitoring application is configured to operate during active periods of dispensing fluid from the fluid dispensing system.

12. A processor-based system for monitoring a fluid dispensing system having a storage tank and a piping system, the piping system having a maximum output flow rate threshold, the processor-based system comprising:

a dispenser configured to dispense fluid from the fluid dispensing system during a dispensing time interval;

a metering device in fluid communication with piping system, the metering device configured to measure a plurality of sample flow rates over time in response to fluid passing through the metering device, wherein the metering device comprises a module for detecting changes in fluid flow direction;

a processor for executing a monitoring application that generates an alert within a substantially real-time period in response to an event of interest, the monitoring application comparing the maximum output flow rate threshold to the plurality of sample flow rates over time to generate the alert when at least one of the sample flow rates exceeds the maximum output flow rate threshold, and wherein the monitoring application is configured to operate during active periods of dispensing fluid from the fluid dispensing system.

\* \* \* \* \*